(12) United States Patent
Nemoto et al.

(10) Patent No.: US 12,214,563 B2
(45) Date of Patent: Feb. 4, 2025

(54) SUPPLY METHOD, SUPPLY DEVICE, AND CLEANING AGENT

(71) Applicant: KEIYO CHEMICAL CO., LTD., Chiba (JP)

(72) Inventors: Tatsuhiro Nemoto, Chiba (JP); Yutaka Kondoh, Chiba (JP); Yuka Kuriyama, Chiba (JP)

(73) Assignee: RAISER MOON, INC., Shiroi (JP)

( * ) Notice: Subject to any disclaimer, the term of this patent is extended or adjusted under 35 U.S.C. 154(b) by 0 days.

(21) Appl. No.: 18/002,051

(22) PCT Filed: Apr. 8, 2021

(86) PCT No.: PCT/JP2021/014879
§ 371 (c)(1),
(2) Date: Dec. 16, 2022

(87) PCT Pub. No.: WO2022/091451
PCT Pub. Date: May 5, 2022

(65) Prior Publication Data
US 2023/0339196 A1 Oct. 26, 2023

(30) Foreign Application Priority Data
Oct. 26, 2020 (JP) .................. 2020-178629

(51) Int. Cl.
*B29C 64/35* (2017.01)
*B29C 71/00* (2006.01)
*B33Y 40/20* (2020.01)

(52) U.S. Cl.
CPC .......... *B29C 71/0009* (2013.01); *B29C 64/35* (2017.08); *B29C 2071/0027* (2013.01); *B33Y 40/20* (2020.01)

(58) Field of Classification Search
CPC ............... B29C 71/0009; B29C 64/35; B29C 2071/0027; B29C 64/40; B33Y 40/20; B08B 1/14; B08B 3/003; B08B 3/10
See application file for complete search history.

(56) References Cited

U.S. PATENT DOCUMENTS 4,282,891 A * 8/1981 Duceppe .............. A45D 29/007
401/122
4,314,856 A * 2/1982 Steimel .................... B08B 7/04
134/40

(Continued)

FOREIGN PATENT DOCUMENTS

JP S5074175 U 6/1975
JP S61249583 A 11/1986

(Continued)

OTHER PUBLICATIONS

Written Opinion of International Searching Authority in PCT/JP2021/014879, mailed Jul. 6, 2021. 9pp.

(Continued)

*Primary Examiner* — Erin F Bergner
(74) *Attorney, Agent, or Firm* — HAUPTMAN HAM, LLP

(57) ABSTRACT

A sponge type cleaning device includes a sponge type cleaning tank, a sponge capable of retaining a cleaning agent (a liquid substance), a sample retaining structure retaining a model material (a sample), a movement mechanism capable of moving the sample retaining structure freely forward and backward with respect to the sponge, a cleaning agent supply mechanism supplying the cleaning agent to the sponge type cleaning tank, a rinsing liquid supply mechanism supplying a rinsing liquid to the sponge type cleaning tank, a waste liquid containing tank containing water discharged from the sponge type cleaning tank, a liquid level (Continued)

sensor provided in the sponge type cleaning tank, and a control mechanism controlling each of the mechanisms.

11 Claims, 31 Drawing Sheets

(56) References Cited

U.S. PATENT DOCUMENTS

| | | | | |
|---|---|---|---|---|
| 4,773,941 | A * | 9/1988 | Iijima | B05C 9/12 |
| | | | | 427/295 |
| 5,378,287 | A * | 1/1995 | Pedziwiatr | B08B 3/123 |
| | | | | 134/79 |
| 5,402,810 | A * | 4/1995 | Donley | B08B 3/044 |
| | | | | 134/200 |
| 5,503,785 | A | 4/1996 | Crump et al. | |
| 10,828,682 | B2 * | 11/2020 | Lazaro | B08B 9/0813 |
| 2007/0012248 | A1 * | 1/2007 | Aucoin | B08B 3/00 |
| | | | | 118/270 |
| 2019/0270254 | A1 * | 9/2019 | Mark | B29C 64/118 |
| 2019/0291347 | A1 * | 9/2019 | Price | B29C 64/35 |
| 2020/0198242 | A1 * | 6/2020 | John | B29C 64/35 |
| 2021/0039318 | A1 * | 2/2021 | Monaco | B08B 7/02 |

FOREIGN PATENT DOCUMENTS

| | | |
|---|---|---|
| JP | S62190686 U | 12/1987 |
| JP | H699149 A | 4/1994 |
| JP | H6296939 A | 10/1994 |
| JP | 200424926 A | 1/2004 |
| JP | 2004255839 A | 9/2004 |
| JP | 200535299 A | 2/2005 |
| JP | 201296428 A | 5/2012 |
| JP | 5731866 B2 | 6/2015 |
| JP | 201682195 A | 5/2016 |
| JP | 201883869 A | 5/2018 |
| JP | 201989323 A | 6/2019 |
| JP | 202075410 A | 5/2020 |
| WO | 0168375 A2 | 9/2001 |
| WO | 2018222395 A1 | 12/2018 |
| WO | WO-2019201922 A1 * | 10/2019 ............ B29C 64/35 |

OTHER PUBLICATIONS

International Search Report in PCT/JP2021/014879, mailed Jul. 6, 2021. 9pp.

Tatsuhiro Nemoto, "Extripper, a New 3D Printer Cleaning Technology, Was Born", Japan Plastics, 2018, vol. 69, No. 10, pp. 52-55 and cover pp. 53. 14pp.

* cited by examiner

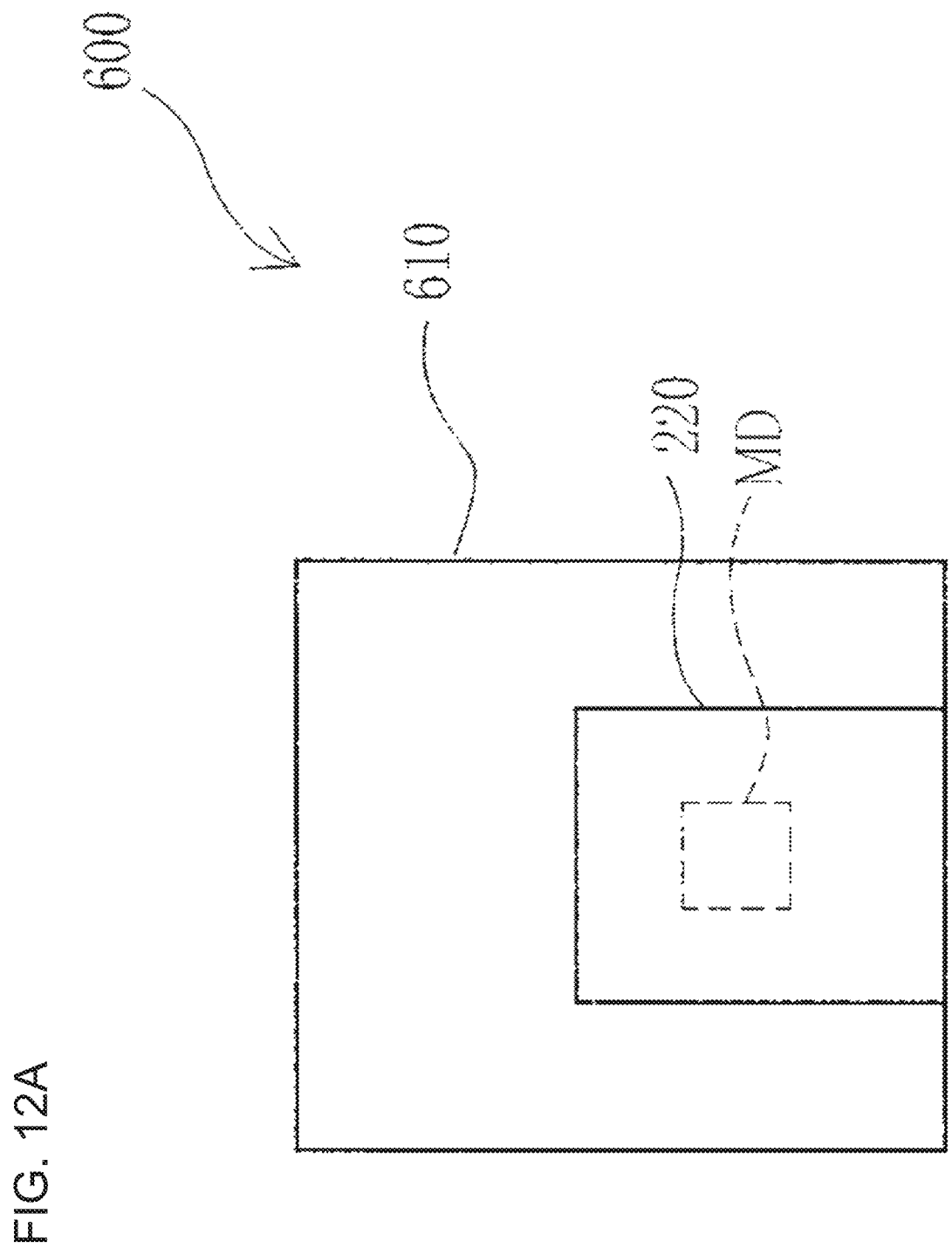

SUPPLY METHOD, SUPPLY DEVICE, AND CLEANING AGENT

CROSS-REFERENCE TO RELATED APPLICATIONS

The present application is a National Phase of International Application No. PCT/JP2021/014879 filed Apr. 8, 2021, which claims the benefit of priority from the prior Japanese patent application No. 2020-178629 filed on Oct. 26, 2020, the entire contents of which are incorporated herein by reference.

TECHNICAL FIELD

The present invention relates to a supply method, a supply device, and a cleaning agent.

BACKGROUND ART

Three-dimensional modeling is a technology in which a desired tridimensional modeled object is obtained on the basis of three-dimensional shape data by fusing or curing a thermoplastic resin, a photo-curable resin, a powder resin, a powder metal, or the like with melting extrusion or inkjet, laser light or an electron beam, and the like to be stacked into the shape of a thin film. Since the modeled object is obtained directly from the shape data, and an intricate shape such as a hollow shape or a mesh shape can be integrally molded, the field of application has been expanded to the medical field, the aircraft industry, the industrial robot, and the like, including the preparation of a test model in which small-lot production or custom-made production is required.

In order to obtain the tridimensional modeled object, a three-dimensional modeling device referred to as a 3D printer has been generally used. Specifically, an inkjet ultraviolet curing type 3D printer using an acrylic photo-curable ink, such as Objet (Registered Trademark) manufactured by Stratasys, Ltd. and AGILISTA (Registered Trademark) manufactured by KEYENCE CORPORATION, a fused deposition modeling type 3D printer using an acrylonitrilebutadienestyrene resin, a polycarbonate resin, a polyphenyl sulfone resin, a polyether imide resin, or the like, such as FORTUS, Dimension, and uPrint, manufactured by Stratasys, Ltd., a powder modeling type 3D printer such as SLS manufactured by 3D Systems Corporation, an optical modeling type 3D printer such as SLA manufactured by 3D Systems Corporation and DigitalWax manufactured by Digital Wax Systems S.R.L., and the like have been known.

In the three-dimensional modeling, the tridimensional modeled object having an intricate shape can be formed, but in order to produce a hollow structure or the like, a structure body for supporting a shape is required to temporarily support the resin during the modeling on a bottom portion of the tridimensional modeled object and to prevent the tridimensional modeled object from being deformed by the own weight. In the case of the powder modeling type 3D printer that binds or fuses a powder raw material, the unbound or unfused powder acts as a support body to support a structural object, and thus, the tridimensional modeled object can be obtained by brushing off the excess powder after the production. In addition, even in the optical modeling type 3D printer that gradually cures a photosensitive resin with laser light or the like, the uncured photosensitive resin supports a structure body, and thus, the support body can be removed by only pulling up the tridimensional modeled object from a photosensitive resin tank. On the other hand, in the case of performing three-dimensional modeling of a fused deposition modeling method or an inkjet method, which has been widely used, the tridimensional modeled object containing a model material and the support body containing a support material are simultaneously formed, and thus, it is necessary to provide a step of removing the support material after the formation.

However, in the case of performing the three-dimensional modeling of the fused deposition modeling method or the inkjet method, removing the support material is not a simple operation at all. Since the support material is fused, or adheres or pressure-sensitively adheres to the model material, in an operation of peeling the support material from the model material, the support material is manually peeled off by generally using a spatula, a brush, or the like, or means such as blowing off the support material with a waterjet is used, but there is a risk such as the damage of the tridimensional modeled object, and thus, a careful operation is required, which becomes a heavy burden.

Therefore, a separation method such as heating, dissolution, a chemical reaction, dynamic cleaning such as hydraulic cleaning, electromagnetic irradiation, and a thermal expansion difference is proposed in accordance with the properties of the support material, in which a material that is soluble in water or an organic solvent, a thermoplastic resin, a water-swellable gel, and the like are used as the support material (Patent Documents 1 and 2). Specifically, it is proposed that the removal of the support material is simplified by using a resin that is easily peeled off from the model material (Patent Documents 3 and 4) or by using wax in the support material to be melted and removed with heat (Patent Document 5).

CITATION LIST

Patent Document

Patent Document 1: JP 2005-035299 A
Patent Document 2: JP 2012-096428 A
Patent Document 3: U.S. Pat. No. 5,503,785
Patent Document 4: WO 2001-068375 A
Patent Document 5: JP 2004-255839 A

SUMMARY OF THE INVENTION

Problem to be Solved by the Invention

However, even in the case of using the support material that is easily peeled off from the model material, it is extremely difficult to efficiently remove the support material clogged in a fine structure (such as a hole or a groove). In particular, a time required for removing increases as the model material is in an intricate form. In addition, in the case of using the method of melting and removing the support material with heat, there is a concern that the model material is deformed as the degree of heating with respect to the model material increases. Therefore, it is also necessary to perform melting and removing while suppressing thermal deformation. In addition, in the case of performing coating in the subsequent step (for example, in a case where the tridimensional modeled object is a figure), the remaining oil content (the support material or the like) causes a coating defect.

As described above, in the three-dimensional modeling, a cleaning method of a support material has been desired to be established in which the model material to which the support material is attached can be cleaned, and an operation time is short. Then, such a problem is important in a three-dimensional modeled object having a fine structure.

Further, not only in the cleaning in the three-dimensional modeling but also in the three-dimensional modeled object having a fine structure (such as a hole or a groove), there are many cases in which a liquid having a predetermined function is not capable of being supplied to the fine structure when the liquid is brought into contact with the three-dimensional modeled object, which is a problem.

Means for Solving Problem

The feature of the invention is that a supply device supplying a liquid substance to an opening formed in a sample includes a gas-liquid supply mechanism supplying a liquid substance containing foam to the opening, in which the gas-liquid supply mechanism is freely switched between a liquid contact state in which the sample is in contact with the liquid substance and a liquid contact retraction state that is retracted from the liquid contact state repeatedly.

The feature of the invention is that a supply method for supplying a liquid substance to an opening formed in a sample, includes a foam producing step of producing foam of the liquid substance, and an alternately liquid contact switching step of switching a liquid contact state in which the sample is in contact with the liquid substance and a liquid contact retraction state that is retracted form the liquid contact state repeatedly.

The feature of the invention is that a cleaning agent for cleaning a high-molecular compound from an object to which the hydrophobic high-molecular compound is attached, has fluidity in a range of higher than or equal to a melting point of the high-molecular compound and lower than a melting point of the object, and contains a solvent, a cleaning component that is soluble in water and acts on the high-molecular compound, and a surfactant, in which foam formation of the cleaning component is accelerated in accordance with an action of the surfactant.

The feature of the invention is that a cleaning agent for cleaning a high-molecular compound from an object to which the hydrophobic high-molecular compound is attached, has fluidity in a range of higher than or equal to a melting point of the high-molecular compound and lower than a melting point of the object, and contains a solvent, a cleaning component that is soluble in water and acts on the high-molecular compound, and a liquid containing a carbonic acid.

Effect of the Invention

According to the invention, it is possible to provide a supply method and a supply device of a cleaning liquid in which an object to which a high-molecular compound is attached can be sufficiently cleaned, and a cleaning operation time is short. Further, it is possible to provide a supply method or a supply device for supplying not only the cleaning agent but also a liquid to a fine structure. Further, according to the invention, it is possible to provide a cleaning agent that can be applied to a supply method and a supply device.

BRIEF DESCRIPTION OF DRAWINGS

FIG. 12A is an explanatory diagram illustrating an outline of the sponge type cleaning device;

MODE(S) FOR CARRYING OUT THE INVENTION

Figure 1:
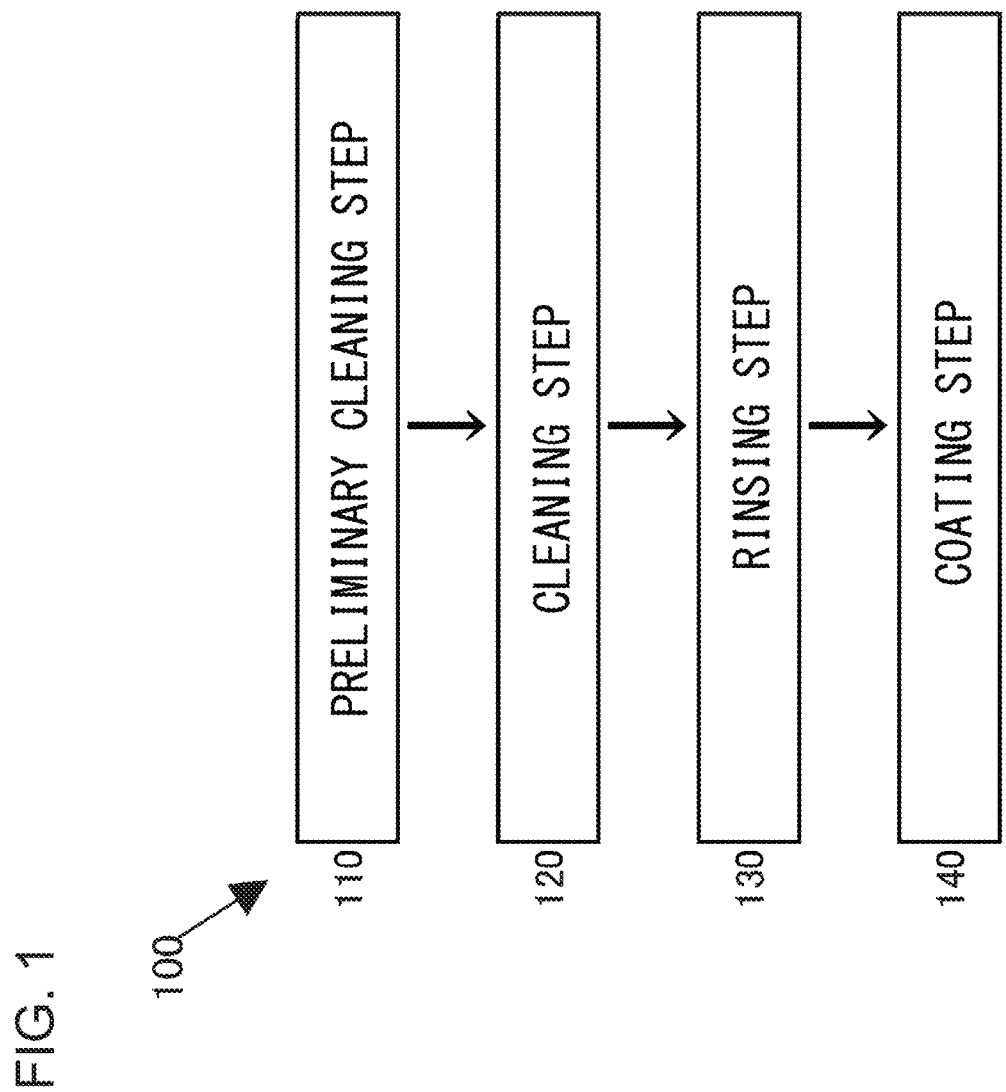
FIG. 1 is a flowchart illustrating an outline of a cleaning method.

As illustrated in FIG. 1, a cleaning method 100 is for removing a support material SP (a high-molecular compound) from a model material MD (an object) to which the support material SP is attached, and includes a preliminary cleaning step 110 of dipping a sample, that is, the model material MD to which the support material SP is attached in a preliminary cleaning agent LQ1, a cleaning step 120 of dipping the sample in a cleaning agent LQ2, after the preliminary cleaning step 110, and a rinsing step 130 of dipping the sample in water (a rinsing liquid), after the cleaning step 120. Note that, as necessary, a coating step 140 of coating the model material MD with a coating liquid LQ3 may be performed after the rinsing step 130.

The model material MD is a material that is used in a fused deposition modeling method, an inkjet method, or the like, and examples thereof include an ultraviolet curable resin, a thermosetting resin, a thermoplastic resin, and the like. More specifically, examples of the model material MD include an acrylonitrilebutadienestyrene resin, a polycarbonate resin, a polyphenyl sulfone resin, a polyether imide resin, an acrylic resin, a polypropylene resin, and the like. In addition, examples of a commercially available product thereof include VisiJet (Registered Trademark, the same applies to the followings) MX, VisiJet EX200, VisiJet SR200, VisiJet HR200, VisiJet DP200, VisiJet CPX200, and VisiJet M2R-CL (manufactured by 3D SYSTEMS JAPAN K.K.), and the like.

In addition, AR-G1L (manufactured by KEYENCE CORPORATION) can also be used as the model material MD. Components of AR-G1L:

| Silicone | 65 weight % |
|---|---|
| Acrylic Monomer | 30 to 35 weight % |
| Organophosphorus Compound | 1 to 5 weight % |
| Phenone Compound | 1 to 5 weight % |

Examples of the support material SP include aliphatic alcohol. Aliphatic alcohol having 1 to 24 carbon atoms is preferable as the aliphatic alcohol. Examples of the aliphatic alcohol include stearyl alcohol (CAS No. 112-95-5) and the like. Examples of a commercially available product thereof include VisiJet200 (manufactured by 3D SYSTEMS JAPAN K.K.) and the like.

In addition, AR-S1 (manufactured by KEYENCE CORPORATION) can also be used as the support material SP. Components of AR-S1:

| Acrylic Monomer | 10 to 25 weight % |
|---|---|
| Polypropylene Glycol | 70 to 90 weight % |
| Photopolymerization Initiator | 1 to 5 weight % |
| Density of Support Material SP: | 1.03 (g/cm$^3$) |

It is preferable that the preliminary cleaning agent LQ1 has hydrophobicity as a whole and easily dissolves the support material SP. Examples of the preliminary cleaning agent LQ1 include fatty acid ester that is used as base oil, and among them, vegetable oil-derived fatty acid ester is preferable. It is preferable that a melting point of the fatty acid ester is lower than a melting point of the support material SP.

Note that, a measurement method of the melting point is based on JIS K 0064-1992 (the same applies to the followings).

In addition, it is preferable that the preliminary cleaning agent LQ1 is solidified (gelled) in a comparatively low temperature range (for example, lower than the melting point of the support material SP). Accordingly, in the preliminary cleaning agent LQ1, another compound may be mixed in addition to the fatty acid ester. That is, it is preferable that a melting point or a softening temperature of a mixture containing the fatty acid ester and the another compound is higher than that of the fatty acid ester. Accordingly, the preliminary cleaning agent LQ1 is liquefied or softened by heating when in use, whereas the fluidity disappears when not in use, and thus, the handling thereof is excellent. The concentration of the fatty acid ester in the preliminary cleaning agent LQ1 is not particularly limited insofar as the effect of the invention can be obtained, and for example, the lower limit thereof is preferably greater than or equal to 30 weight %, more preferably greater than or equal to 50 weight %, and particularly preferably greater than or equal to 80 weight %. Examples of the another compound include solid paraffin (CAS No. 8002-74-2, English Name: Paraffin wax), the same compound as the support material SP, a compound containing a component common to the support material SP, and the like, and such compounds may be independently used or may be used in combination. An upper limit of the concentration of the solid paraffin is not particularly limited insofar as the effect of the invention can be obtained, and for example, is 80 weight %, preferably 70 weight %, and more preferably 60 weight %. Therefore, the preliminary cleaning agent LQ1 that was used in the preliminary cleaning step 110 in the past can be used again in the preliminary cleaning step 110, within a range in which the effect of the invention can be obtained.

Note that, a measurement method of the softening temperature is based on JIS K 7206-1991 (the same applies to the followings).

The cleaning agent LQ2 is soluble in water as a whole, and contains a solvent and a surfactant. The cleaning agent LQ2, as necessary, may contain additives.

Water or alcohol is preferable as the solvent. It is preferable that the water is distilled water. For example, methanol, ethanol, propanol, butanol, pentanol, ethylene glycol, glycerin, or the like can be applied as the alcohol. The concentration of the solvent is not particularly limited insofar as the effect of the invention can be obtained, and is preferably greater than or equal to 10 weight % and less than or equal to 99 weight %, more preferably greater than or equal to 50 weight % and less than or equal to 99 weight %, and even more preferably greater than or equal to 60 weight % and less than or equal to 99 weight %.

It is preferable that the surfactant acts on the removal of the support material SP from the model material MD. Examples of the surfactant include an anionic surfactant, a cationic surfactant, a nonionic surfactant, an amphoteric surfactant, or the like.

Examples of the anionic surfactant include a sodium salt or a potassium salt of a fatty acid, an alkyl benzene sulfonate, a higher alcohol sulfuric ester salt, a polyoxyalkylene monoalkyl ether salt, α-sulfofatty acid ester, an α-olefin sulfonate, a monoalkyl phosphoric ester salt, an alkane sulfonate, and the like.

Examples of the cationic surfactant include an alkyl trimethyl ammonium salt, a dialkyl dimethyl ammonium salt, an alkyl dimethyl benzyl ammonium salt, an amine salt (for example, an N-methyl bishydroxyethyl amine fatty acid ester hydrochloride), and the like.

Examples of the amphoteric surfactant include an alkyl aminofatty acid salt, alkyl betaine, alkyl amine oxide, and the like.

Examples of the nonionic surfactant include polyoxyethylene alkyl ether, polyoxyethylene alkyl phenol ether, alkyl glucoside, polyoxyethylene fatty acid ester, sucrose fatty acid ester, sorbitan fatty acid ester, polyoxyethylene sorbitan fatty acid ester, fatty acid alkanol amide, and the like.

It is preferable to have an amino group and a hydrophilic group (excluding an amino group), as a specific example of the surfactant. Examples of the hydrophilic group (excluding an amino group) include a hydroxy group, a carboxy group, a carbonyl group, a sulfo group, and the like. Specific examples thereof include ethanol amines (monoethanol amine, diethanol amine, or triethanol amine) and the like. In addition, polyoxyalkylene monoalkyl ether (CAS No. 77029-64-2) or the like can also be used.

The concentration of the surfactant is not particularly limited insofar as the effect of the invention can be obtained, and is preferably greater than or equal to 1 weight % and less than or equal to 40 weight % with respect to the entire cleaning agent, more preferably greater than or equal to 1 weight % and less than or equal to 30 weight %, and even more preferably greater than or equal to 1 weight % and less than or equal to 25 weight % with respect to the entire cleaning agent.

Further, in order to improve foaming, a surfactant other than the surfactant added to act on the removal of the support material SP from the model material MD may be contained. It is preferable that the surfactant is suitably selected from the surfactants described above. The concentration of the surfactant for improving the foaming is not particularly limited insofar as the effect of the invention can be obtained, and is preferably greater than or equal to 1 weight % and less than or equal to 30 weight %, more preferably greater than or equal to 1 weight % and less than or equal to 20 weight %, and even more preferably greater than or equal to 1 weight % and less than or equal to 10 weight %, with respect to the entire cleaning agent.

Examples of the additive include a metal ion builder, an alkali builder, a dispersionre-contamination prevention builder, an enzyme, a fluorescent brightening agent, a bleaching agent, a foam control agent, other adjuvants, and the like, for example, include sodium xylene sulfonate (CAS No. 1300-72-7), sodium silicate (CAS No. 6834-92-0), and the like. The concentration of the additive is not particularly limited insofar as the effect of the invention can be obtained, and is preferably greater than or equal to 1 weight % and less than or equal to 20 weight %.

The coating liquid LQ3 is not limited insofar as the coating liquid is capable of forming a coating layer having light transmissivity with respect to the surface of the model material MD. It is preferable to include alcohol having an amino group as the coating liquid LQ3. Examples of the alcohol having an amino group include ethanol amines (monoethanol amine (CAS 141-43-5), diethanol amine (CAS 111-42-2), triethanol amine (CAS 102-71-6)), and the like. Note that, an aqueous solution of the ethanol amines is preferable. The concentration of the ethanol amines is not particularly limited insofar as the effect of the invention can be obtained, and is preferably greater than or equal to 10 weight % and less than or equal to 40 weight %. In addition, as the coating liquid LQ3, polypropylene glycol or a stearic acid may be used.

Note that, the coating liquid LQ3 may contain a component common to the cleaning agent LQ2.

Figure 2:
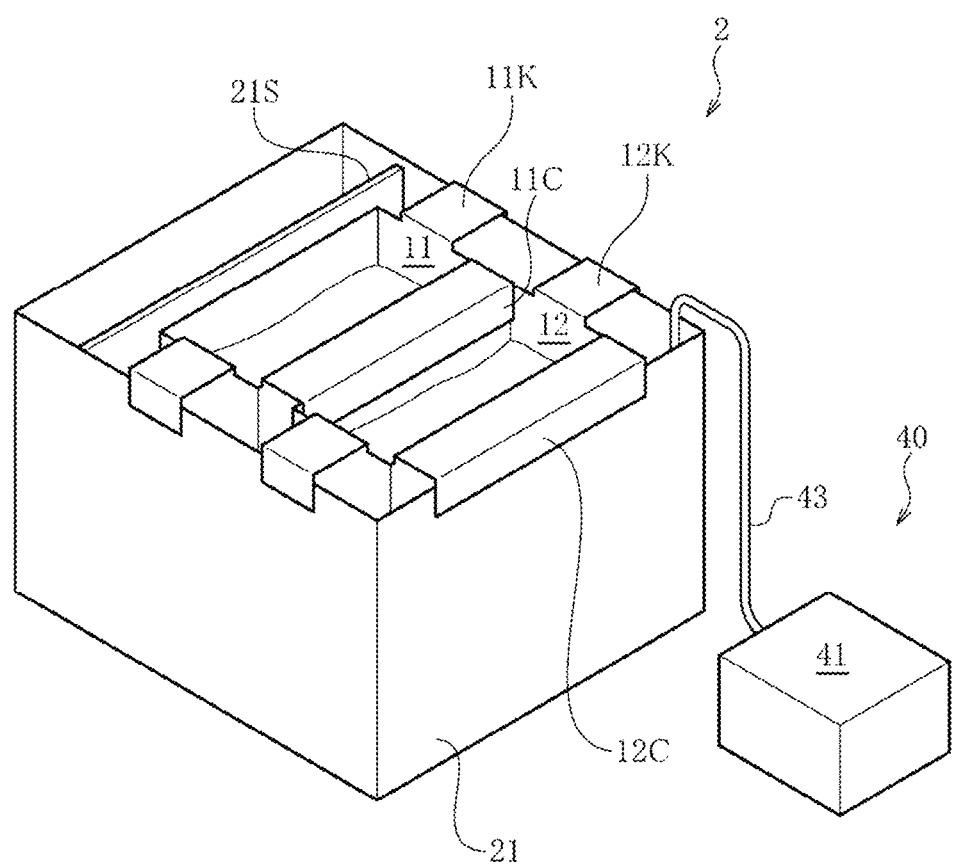
FIG. 2 is a perspective view illustrating an outline of a cleaning device.
Figure 3A:
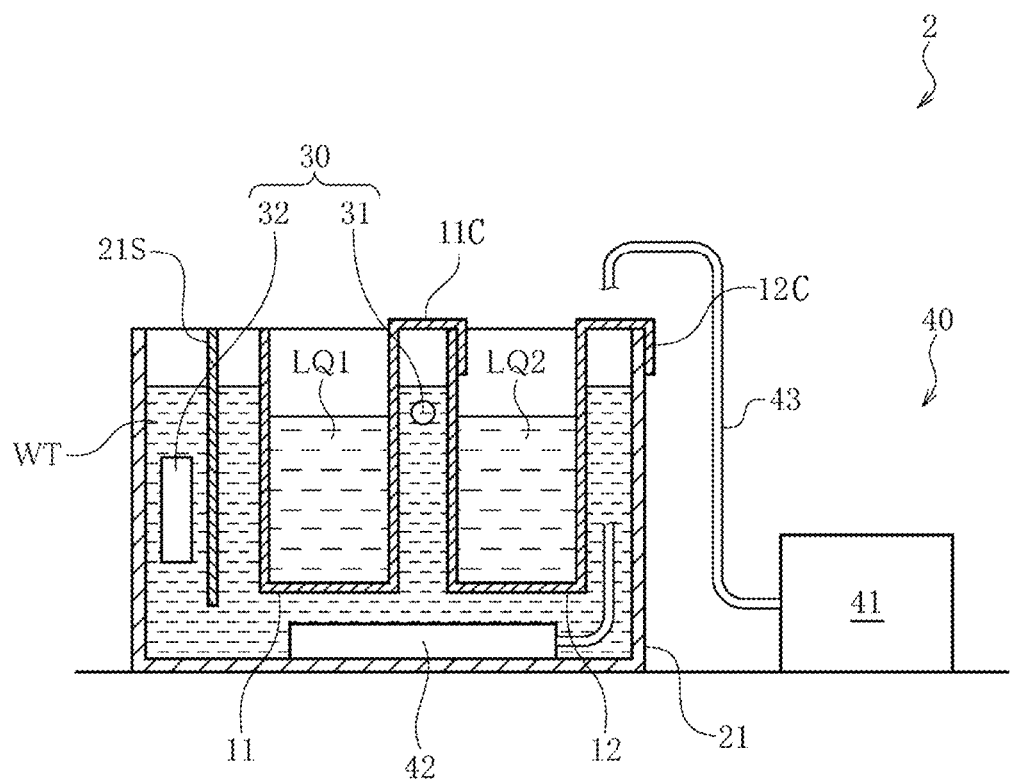
FIG. 3A is a sectional view illustrating an outline of the cleaning device.
Figure 3B:
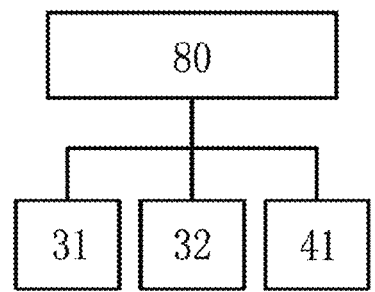
FIG. 3B is a block diagram illustrating connection between a controller and each unit.

As illustrated in FIGS. 2, 3A and 3B, a cleaning device 2 is for performing the preliminary cleaning step 110 to the cleaning step 120 of the cleaning method 100, and includes a preliminary cleaning tank 11 containing the preliminary cleaning agent LQ1, a cleaning tank 12 containing the cleaning agent LQ2, an outer container 21 containing the preliminary cleaning tank 11 and the cleaning tank 12, a temperature adjustment unit 30 for adjusting the temperature of water WT contained in the outer container 2, an ultrasonic unit 40 for applying an ultrasonic wave to the water WT, or to the preliminary cleaning agent LQ1 or the cleaning agent LQ2 through the preliminary cleaning tank 11 or the cleaning tank 12, and a controller 80 controlling each of the units.

Both of the preliminary cleaning tank 11 and the cleaning tank 12 contain a material having excellent thermal conductivity (for example, a metal or the like). The outer container 21 contains the water WT. The middle portion to the bottom portion of the preliminary cleaning tank 11 and the cleaning tank 12 are dipped in the water WT. An engagement portion 12K is provided on an opening edge of the cleaning tank 12. The engagement portion 12K is engaged with an opening edge of the outer container 21, and thus, the cleaning tank 12 is capable of maintaining a state of being separated from the bottom of the outer container 21. An engagement portion 11K is provided on an opening edge of the preliminary cleaning tank 11. The engagement portion 11K is engaged with the opening edge of the cleaning tank 12, and thus, the preliminary cleaning tank 11 is capable of maintaining a state of being separated from the bottom of the outer container 21. Note that, the engagement portion 11K may be engaged with the opening edge of the outer container 21.

The engagement portion 11K of the preliminary cleaning tank 11 and the engagement portion 12K of the cleaning tank 12 also function as a cover for preventing impurities such as the first liquid LQ1 and the second liquid LQ2 from being mixed in the water WT.

The temperature adjustment unit 30 includes a temperature sensor 31 detecting the temperature of the water WT contained in the outer container 21, and a heater 32 heating the water WT contained in the outer container 21.

The ultrasonic unit 40 includes a control box 41 disposed outside the outer container 21, an oscillator 42 disposed in the water WT of the outer container 21, and a cable 43 connecting the control box 41 and the oscillator 42. The frequency of the ultrasonic wave of the ultrasonic unit 40 is not particularly limited, and for example, is preferably greater than or equal to 30 Hz and less than or equal to 60 Hz. An application time of the ultrasonic wave is not also particularly limited.

A cover 21S for covering the heater is provided in the outer container 21. The cover 21S partitions the outer container 21 other than the bottom portion. Accordingly, the heat from the heater 32 is transferred to the preliminary cleaning agent or the cleaning agent, and a failure due to the application of an ultrasonic wave with respect to the heater 32 is suppressed.

The controller 80 is electrically connected to the temperature sensor 31, the heater 32, the control box 41, or the like.

Next, the cleaning method 100 will be described by using FIGS. 4A, 4B, 4c and 4D.

(Preliminary Cleaning Step 110)

The temperature adjustment unit 30 adjusts the temperature of the preliminary cleaning agent LQ1 or the cleaning agent LQ2 in a range of lower than the melting point of the model material and higher than or equal to the melting point of the support material, under the control of the controller 80. At this time, both of the preliminary cleaning agent LQ1 and the cleaning agent LQ2 are a liquid and have fluidity. Further, power is applied to the ultrasonic unit 40, and an ultrasonic wave is applied to the preliminary cleaning agent LQ1 or the cleaning agent LQ2, under the control of the controller 80.

Figure 4A:
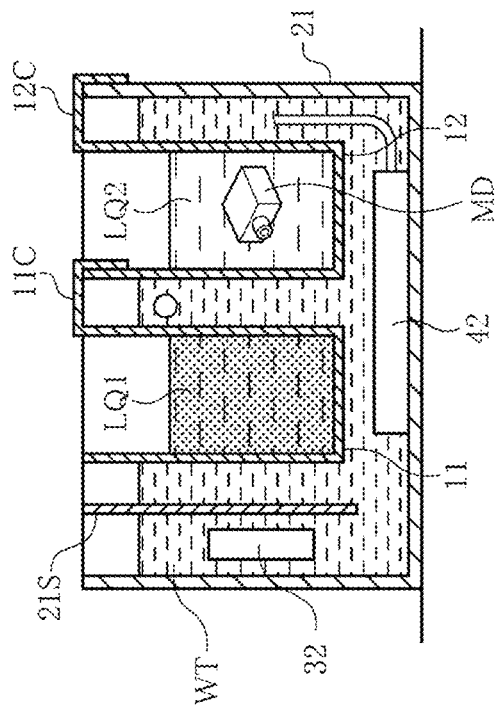
FIG. 4A is a sectional view illustrating an outline of the cleaning device in the preliminary cleaning step of the cleaning method.

Next, the model material MD to which the support material SP is attached is put in the preliminary cleaning agent LQ1 (FIG. 4A). Since the preliminary cleaning agent LQ1 contains a component having compatibility with respect to the support material SP, most of the support material SP is dissolved in the preliminary cleaning agent LQ1 (FIG. 4B). After a predetermined period of time has elapsed, the model material MD is pulled up from the preliminary cleaning agent LQ1. As described above, most of the support material SP is removed from the model material MD by the action of the preliminary cleaning agent LQ1, the temperature, or the ultrasonic wave.

When the model material MD is pulled up from the preliminary cleaning agent LQ1, a part of the support material SP remains in the model material MD.

(Cleaning Step 120)

Figure 4D:
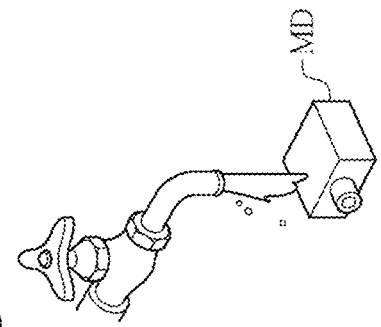
FIG. 4D is a sectional view illustrating an outline of the cleaning device in the rinsing step of the cleaning method.
Figure 4B:
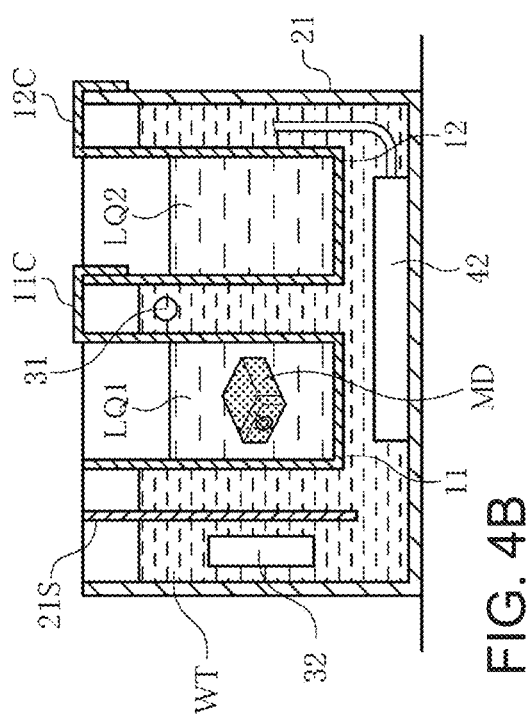
FIG. 4B is a sectional view illustrating an outline of the cleaning device in the preliminary cleaning step of the cleaning method.
Figure 4C:
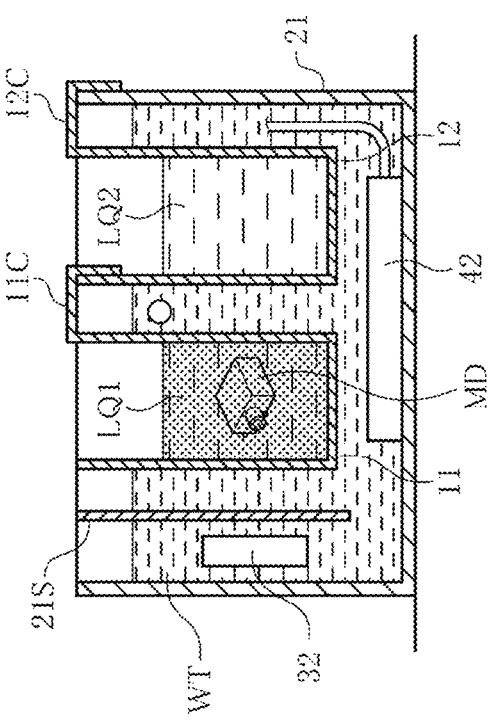
FIG. 4C is a sectional view illustrating an outline of the cleaning device in the cleaning step of the cleaning method.

Next, the model material MD to which the support material SP is attached is put in the liquid cleaning liquid LQ2 (FIG. 4C). Most of the remaining support material SP is removed from the model material MD by the action of the component (in particular, the surfactant) of the cleaning liquid LQ2 to exist in the cleaning agent LQ2.

When the model material MD is pulled up from the cleaning agent LQ2, almost no support material SP remains in the model material MD. At this time, the support material SP remaining in the model material MD is easily washed out with water, an aqueous solution, or the like, by the action of the surfactant contained in the cleaning agent LQ2.

(Rinsing Step 130)

The model material MD pulled up from the cleaning agent LQ2 is put in water (FIG. 4D). The temperature of the water may be a room temperature, and is more preferably lower than the melting point of the model material and higher than the melting point of the support material SP. It is preferable that the water is distilled water.

Note that, in the rinsing step 130, another tank containing hot water of a predetermined temperature may be put in the outer container 21 and an ultrasonic wave may be applied in a state where the model material MD is dipped in the hot water. In addition, in the rinsing step 130, an aqueous solution in which another compound (for example, alcohol or the like) is dissolved in distilled water, an aqueous solution in which another compound is dispersed in distilled water, or the like may be used instead of the distilled water. That is, it is preferable that the rinsing liquid used in the rinsing step 130 has compatibility with respect to the cleaning agent LQ2.

(Coating Step 140)

As necessary, the model material MD is put in the coating liquid LQ3. After a predetermined period of time has elapsed, the model material MD is pulled up from the coating liquid LQ3. Accordingly, the surface layer of the model material MD is coated with the coating liquid LQ3. After that, the coating layer is formed on the surface layer of the model material MD by the elapse of a predetermined period of time.

As described above, according to the invention, since a liquid material such as the preliminary cleaning agent LQ1 or the cleaning agent LQ2 is used, even in a case where the model material MD has an intricate shape, the liquid reaches the depth of the shape, and thus, the support material SP in the depth of the shape can be removed.

Here, a case is considered in which the cleaning step 120 is performed with respect to the model material MD to which the support material SP is attached without performing the preliminary cleaning step 110. In the cleaning step 120, in a case where the cleaning agent LQ2 is brought into contact with the model material MD, the support material SP attached to the model material MD can be removed by the action of the surfactant contained in the cleaning agent LQ2. However, since the degree of removing action of the support material SP according to the surfactant is greatly affected by the amount of surfactant, in a case where the cleaning step 120 is performed with respect to the model material MD to which a large amount of the support material SP is attached without performing the preliminary cleaning step 110, a large amount of the support material SP may be contained in the cleaning agent LQ2. In the cleaning agent LQ2 in such a state, the removing action of the support material SP can hardly be expected.

It can be assumed that a decrease in the removing action of the support material SP is caused by a decrease in the removing action due to a decrease in the concentration of the cleaning agent LQ2 in the cleaning tank 12, and the improvement of a viscosity due to an increase in the concentration of the support material SP in the cleaning tank 12.

Accordingly, in order to maintain the removing action of the support material SP in the cleaning step 120, it is necessary to add a new cleaning agent LQ2.

In the invention, the support material SP is brought into contact with the preliminary cleaning agent LQ1 that is capable of dissolving the support material, before the support material SP is brought into contact with the cleaning agent LQ2 that is capable of removing the support material. Accordingly, the amount of support material SP that is attached to the model material MD can be minimized at a start point of the cleaning step 120. Accordingly, a removing effect of the support material SP according to the cleaning agent LQ2 in the cleaning step 120 can be maintained. In addition, a removing action of the support material SP according to the preliminary cleaning agent LQ1 is an action according to compatibility with respect to the support material SP, but not the action of the surfactant such as the cleaning agent LQ2. Accordingly, even in a case where a large amount of support material SP remains in the preliminary cleaning agent LQ1, the removing action of the support material SP can be maintained. As described above, the removing action of the support material SP can be maintained by combining the preliminary cleaning step 110 and the cleaning step 120.

Further, when the model material MD is pulled up from the cleaning agent LQ2, almost no support material SP remains in the model material MD. At this time, the support material SP remaining in the model material MD is easily washed out with water, an aqueous solution, or the like, by the action of the surfactant contained in the cleaning agent LQ2. Accordingly, the support material SP can be removed from the model material MD by performing the rinsing step 130 after the cleaning step 120.

In addition, a mixture of the preliminary cleaning agent LQ1 and the support material SP may have fluidity in the preliminary cleaning step 110, and it is preferable that the fluidity is lost in a low temperature range (for example, a room temperature). Accordingly, the mixture is easily handled as a waste material. Further, such a mixture can also be used as a general waste material, or can also be used as fuel.

Note that, a layer containing the mixture of the preliminary cleaning agent LQ1 and the support material SP is formed on the surface of the model material MD pulled up from the preliminary cleaning agent LQ1. In a case where such a model material MD is at a temperature lower than the melting point of the support material SP (for example, a normal temperature), the layer is solidified (gelled). In addition, the layer is dissolved at a temperature higher than the melting point of the support material SP. Therefore, the layer containing the mixture of the preliminary cleaning agent LQ1 and the support material SP can also be used as a protective layer of the model material.

On the other hand, the mixture of the cleaning agent LQ2 and the support material SP is a liquid in the cleaning step 120, but is soluble in water, and thus, is comparatively safe. Such a mixture is easily managed as a waste material. In addition, the mixture of the cleaning agent LQ2 and the support material SP may have fluidity in the cleaning step 120, and it is preferable that the fluidity is lost in a low temperature range (for example, a room temperature).

In addition, the model material MD may be weak against heat, in accordance with the material thereof. In such a case, the model material MD may be deformed in accordance with a temperature increase. In such a case, in a case where the model material MD is heated in the air, the model material is easily deformed by the own weight.

According to the invention, the model material MD is heated in solution, and thus, the deformation of the model material due to the own weight is suppressed by a buoyant force, compared to a case where the model material is heated in the air.

In the case of imparting glossiness to the model material MD after the rinsing step 130, the coating step 140 is performed, and the coating layer having light transmissivity is formed by the coating liquid LQ3, and thus, the glossiness increases, and the appearance is improved.

The reason for an increase in the glossiness according to the coating layer and the improvement of the appearance is assumed as follows. A lamination trace at the modeling may remain in the shape of a stripe, on the surface of the model material MD. In the case of removing the support material SP, the glossiness is lost by reflection due to the lamination trace at the modeling, and the appearance becomes cloudy. On the other hand, in a case where the coating layer is formed on the lamination trace at the modeling, reflection occurs on the coating layer, and thus, the glossiness increases, and the appearance is improved.

In the embodiment described above, in the cleaning method 100, the coating step 140 is performed, but the invention is not limited thereto. In the case of trying not to allow impurities (the support material SP, the coating layer of the coating liquid LQ3, or the like) to remain on the surface of the model material MD or in a case where the appearance is not required, the coating step 140 may be omitted.

Note that, it is preferable that the density of the solvent of the cleaning agent LQ2 is different from the density of the support material SP. For example, in a case where the density of the support material SP is greater than the density of the solvent of the cleaning agent LQ2, in a second dipping step, the support material SP is separated from the cleaning agent LQ2 by a density difference, and sinks into the bottom of the cleaning tank 12. Accordingly, in a case where the model material MD is tried to be pulled out from the cleaning agent LQ2, the removed support material SP is less likely to be attached again to the model material MD.

In the embodiment described above, in the cleaning method 100, the preliminary cleaning step 110 is performed, but the invention is not limited thereto. In a case where an attachment amount of the support material that is attached to the model material MD is small, the preliminary cleaning step 110 may be omitted.

In the embodiment described above, the cleaning step 120 is performed in a state in which the opening of the preliminary cleaning tank 11 or the cleaning tank 12 is released with respect to the atmospheric air, but the invention is not limited thereto. For example, the cleaning step 120 may be performed in a state in which each opening is sealed with respect to the atmospheric air.

The cleaning device 2 may include a sealing unit 60 containing the preliminary cleaning tank 11 or the cleaning tank 12, a pump 70 reducing the pressure of the internal space of the sealing unit 60, and a temperature adjustment unit 75, in addition to the configuration described above (FIGS. 5A, 5B and 6).

The sealing unit 60 includes a containing tool 61, a lid 62 capable of closing an opening of the containing tool 61, a packing 63 provided on the lid 62, and a release valve 64. The containing tool 61 includes a containing space 61KX that is capable of containing the preliminary cleaning tank 11 or the cleaning tank 12. An opening of the containing space 61KX is opened upward. In a case where the opening of the containing space 61KX is closed by using the lid 62, the containing space 61KX is sealed by the packing 63 (FIG. 5B). The release valve 64 can be freely switched between an open state in which the containing space 61KX is communicated with the external space and a closed state in which the containing space 61KX and the external space are not connected, under the control of the controller 80.

The pump 70 includes a pump main body 71 provided with an air inlet 71A and an air outlet 71B, piping 72 communicating the air inlet 71A with the containing space 61KX, and a pressure meter 73 measuring the pressure of the containing space 61KX. The controller 80 drives the pump main body 71 while reading a measured value of the pressure meter 73. Accordingly, the pump 70 is capable of adjusting the internal pressure of the containing space 61KX to a predetermined range, under the control of the controller 80.

The temperature adjustment unit 75 includes a temperature sensor 75S detecting each temperature of the cleaning agents LQ1 to LQ2 contained in the preliminary cleaning tank 11 and the cleaning tank 12, respectively, and an induction heating-type heater 75H provided on the bottom surface inside the containing tool 61.

The temperature adjustment unit 75 adjusts the temperature of the preliminary cleaning agent LQ1 or the cleaning agent LQ2 to a range of lower than the melting point of the model material and higher than or equal to the melting point of the support material, under the control of the controller 80. At this time, both of the preliminary cleaning agent LQ1 and the cleaning agent LQ2 are a liquid.

Note that, as necessary, an ultrasonic wave may be applied to the preliminary cleaning agent LQ1 or the cleaning agent LQ2 by using the ultrasonic unit 40 (FIG. 3A), under the control of the controller 80.

Next, a method for using the sealing unit 60 will be described.

(Preliminary Cleaning Step 110)

Figure 5A:
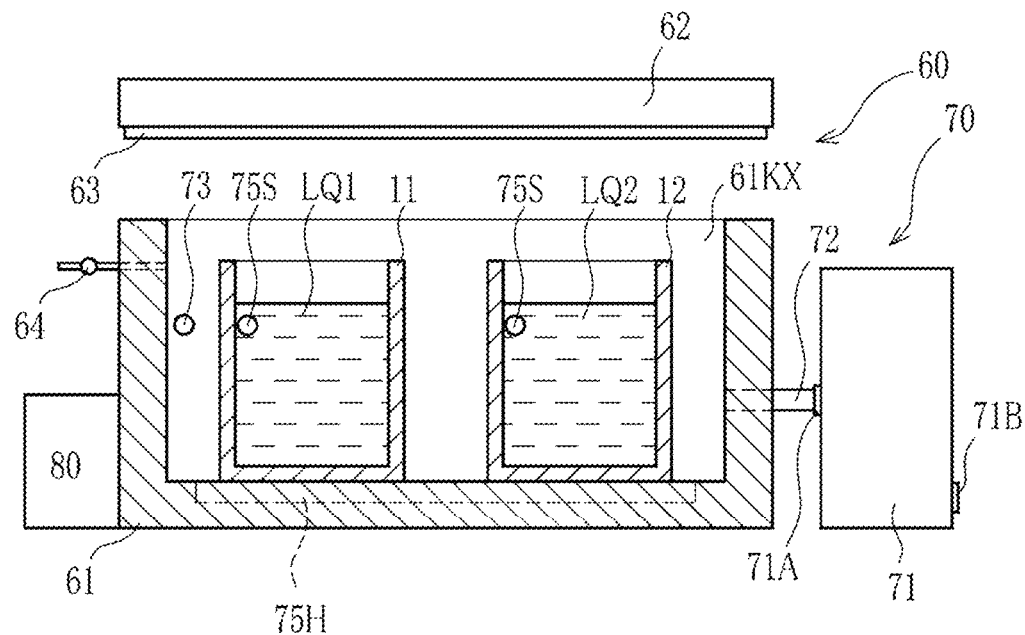
FIG. 5A is a partial sectional view illustrating an outline of a sealing unit that can be applied to the cleaning device.
Figure 5B:
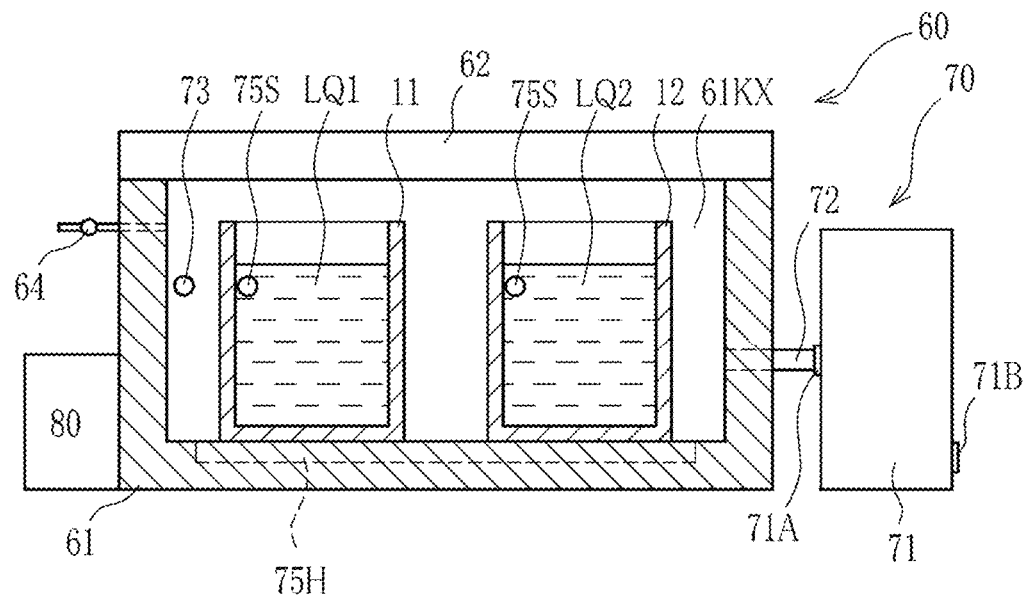
FIG. 5B is a partial sectional view illustrating an outline of a sealing unit that can be applied to the cleaning device.
Figure 6:
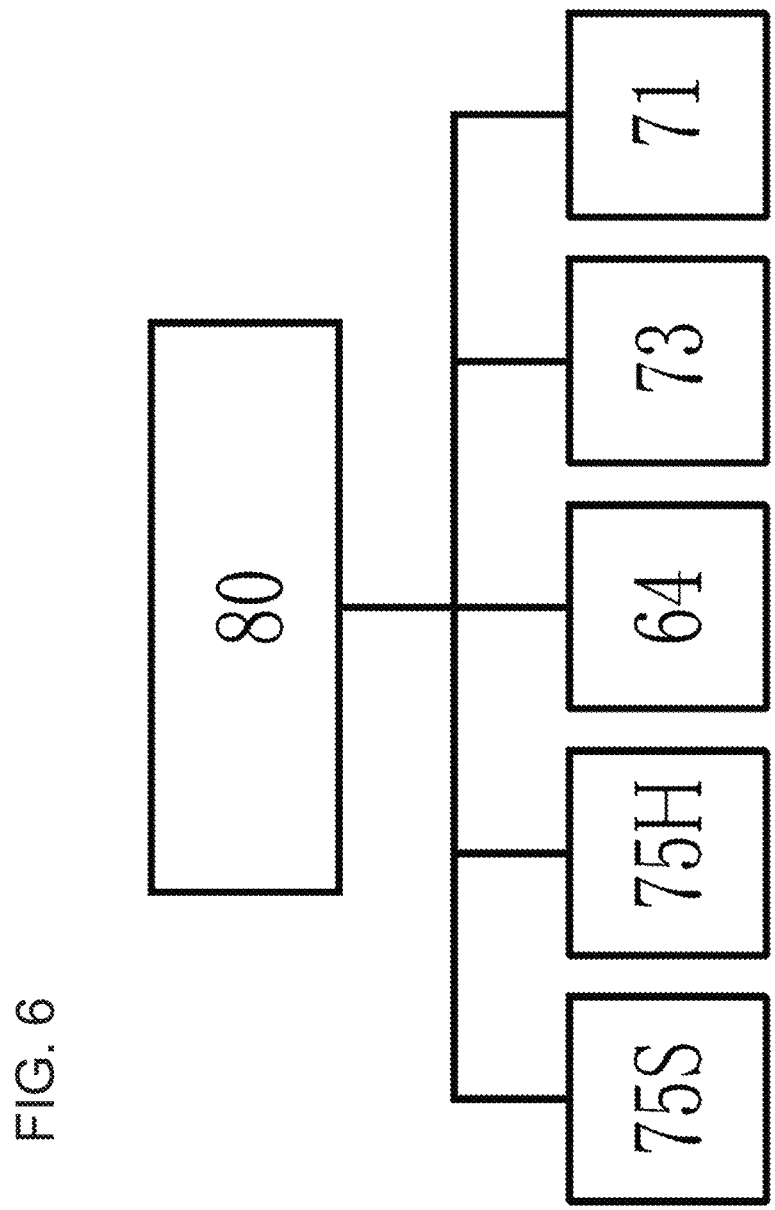
FIG. 6 is a block diagram illustrating connection between a controller and each unit.

As illustrated in FIG. 5A, the preliminary cleaning tank 11 is disposed in the containing space 61KX. The model material MD to which the support material SP is attached is put in the preliminary cleaning agent LQ1. The temperature adjustment unit 75 adjusts the temperature of the preliminary cleaning agent LQ1 to a range lower than the melting point of the model material MD and higher than or equal to the melting point of the support material SP, under the control of the controller 80.

Next, the release valve 64 is closed. In the case of closing the opening of the containing space 61KX by using the lid 62, the containing space 61KX becomes a sealing space by the packing 63 (FIG. 5B). The pump 70 adjusts the internal pressure of the containing space 61KX to a predetermined range, under the control of the controller 80.

Since the preliminary cleaning agent LQ1 contains the component having compatibility with respect to the support material SP, most of the support material SP is dissolved in the preliminary cleaning agent LQ1. Further, the model material MD to which the support material SP is attached is placed in an environment in which the pressure is lower than the atmospheric pressure, and thus, gas existing in the support material SP or in a boundary portion between the model material MD and the support material SP is moved to the outside. As a result of such air exchange, the removal of the support material SP from the model material MD is performed. After a predetermined period of time has elapsed, the pump 70 is stopped, the release valve 64 is opened, the lid 62 is opened, and the model material MD from the preliminary cleaning agent LQ1 is pulled up.

(Cleaning Step 120)

Next, the model material MD pulled up from the preliminary cleaning agent LQ1 is put in the cleaning liquid LQ2. The temperature adjustment unit 75 adjusts the temperature of the cleaning agent LQ2 to a range of lower than the melting point of the model material MD and higher than or equal to the melting point of the support material SP, under the control of the controller 80.

Next, in a case where the release valve 64 is closed, and the opening of the containing space 61KX is closed by using the lid 62, the containing space 61KX becomes the sealing space by the packing 63 (FIG. 5B). The pump 70 adjusts the internal pressure of the containing space 61KX to a predetermined range, under the control of the controller 80.

The remaining support material SP is removed from the model material MD to exist in the cleaning agent LQ2, by the action of the surfactant of the cleaning liquid LQ2. Further, the model material MD to which the support material SP is attached is disposed in an environment in which the pressure is lower than the atmospheric pressure, and thus, the removal of the support material SP from the model material MD is performed. As a result thereof, a small amount of the support material SP remains in the model material MD. After a predetermined period of time has elapsed, the pump 70 is stopped, the release valve 64 is opened, the lid 62 is opened, and the model material MD is pulled up from the cleaning agent LQ2.

Here, the factor that the removal of the support material SP from the model material MD is accelerated in the case of performing the preliminary cleaning step 110 or the cleaning step 120 in an environment in which the pressure is lower than the atmospheric pressure is assumed as follows.

A constant amount of gas exists in the support material SP or in the boundary portion between the model material MD and the support material SP, at a modeling completion point of the model material MD. However, even in the case of performing the preliminary cleaning step 110 or cleaning step 120 in an environment of approximately the same air pressure identical as that at the modeling, the gas still exists inside. However, in the case of performing the preliminary cleaning step 110 or the cleaning step 120 in an environment in which the pressure is lower than that at the modeling, by using the pump 70, the gas easily flies out to the external space by an air pressure difference. As a result of such air exchange, the removal of the support material SP from the model material MD is accelerated.

Note that, it is preferable that the pump 70 reduces the internal pressure of the containing space 61KX to the extent that the cleaning liquid LQ2 is in a boiling state. The air exchange is accelerated by a boiling phenomenon, and thus, the removal of the support material SP from the model material MD is performed.

(Rinsing Step 130)

After that, the model material MD pulled up from the cleaning agent LQ2 is put in a beaker containing hot water to perform the rinsing step 130. It is preferable that the temperature of the hot water is adjusted to a range of lower than the melting point of the model material MD and higher than or equal to the melting point of the support material SP. An ultrasonic wave may be applied to the hot water contained in the beaker by driving the ultrasonic unit 40.

As described above, by performing the preliminary cleaning step 110 or the cleaning step 120 in an environment in which the pressure is lower than the atmospheric pressure, the removal of the support material SP from the model material MD is accelerated. In order to obtain the removing action of the support material SP from the model material MD, a higher temperature is required, but the preliminary cleaning step 110 or the cleaning step 120 is performed in an environment of a lower pressure, and thus, it is possible to obtain the removing action of the support material SP from the model material MD without forming an environment of a higher temperature. Therefore, in a case where the material of the model material MD is weak against heat, the preliminary cleaning step 110 or the cleaning step 120 is performed in an environment in which the pressure is lower than the atmospheric pressure, and thus, it is possible to obtaining the removing action of the support material SP while avoiding thermal deformation.

In an environment released to the external space, such as the cleaning device 2 illustrated in FIGS. 2 and 3A, the preliminary cleaning step 110 or the cleaning step 120 may be performed while driving the ultrasonic unit 40, between the preliminary cleaning step 110 in the sealing unit 60 and the cleaning step 120 in the sealing unit 60 or after the cleaning step 120 in the sealing unit 60.

In addition, the preliminary cleaning step 110 may be omitted in accordance with a desired cleaning degree.

However, in a case where a fine structure is formed in the model material MD, it may not be possible to remove the support material SP penetrating through the fine structure. Examples of the fine structure include a through hole, a groove, or the like. The size of the through hole, for example, is preferably less than or equal to 2 mm, more preferably less than or equal to 1 mm, and even more preferably less than or equal to 0.5 mm. In addition, the width of the groove, for example, is preferably less than or equal to 2 mm, more preferably less than or equal to 1 mm, and even more preferably less than or equal to 0.5 mm.

Figure 7:
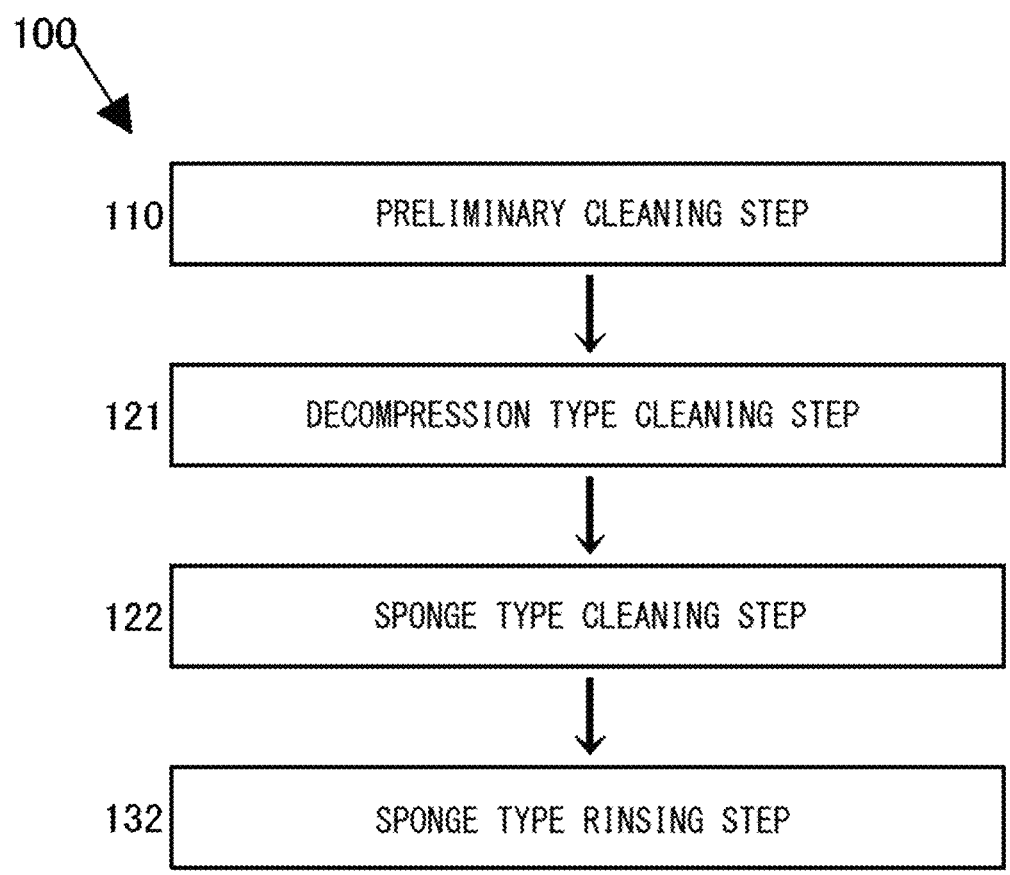
FIG. 7 is a flowchart illustrating an outline of the cleaning method.

In the cleaning method 100 in the case of the model material MD having such a fine structure, it is preferable that a cleaning step (hereinafter, referred to as a decompression type cleaning step) 221 using the sealing unit 60, and a sponge type cleaning step 222 using a sponge type cleaning device 200, which is performed after the decompression type cleaning step 221, are performed instead of the cleaning step 120 (FIG. 7). Further, it is preferable that a sponge type rinsing step 132 is performed instead of the rinsing step 130.

Note that, in some cases, a decompression type cleaning step 121 may be omitted. In addition, the cleaning step 120 using the cleaning device 2 may be performed instead of the decompression type cleaning step 121.

In addition, as necessary, a coating step 140 of coating the model material MD with the coating liquid LQ3, which is performed after the rinsing step 130 or the sponge type rinsing step 132, may be performed.

Next, the sponge type cleaning device 200 will be described by using FIGS. 8, 9, 10A, 10B, 11A, 11B, and 11C.

Hereinafter, for explanatory convenience, a predetermined direction in the horizontal plane is set to an X direction, a direction orthogonal to the X direction in the horizontal plane is set to a Y direction, and a direction orthogonal to the X direction and the Y direction is set to a Z direction.

Figure 8:
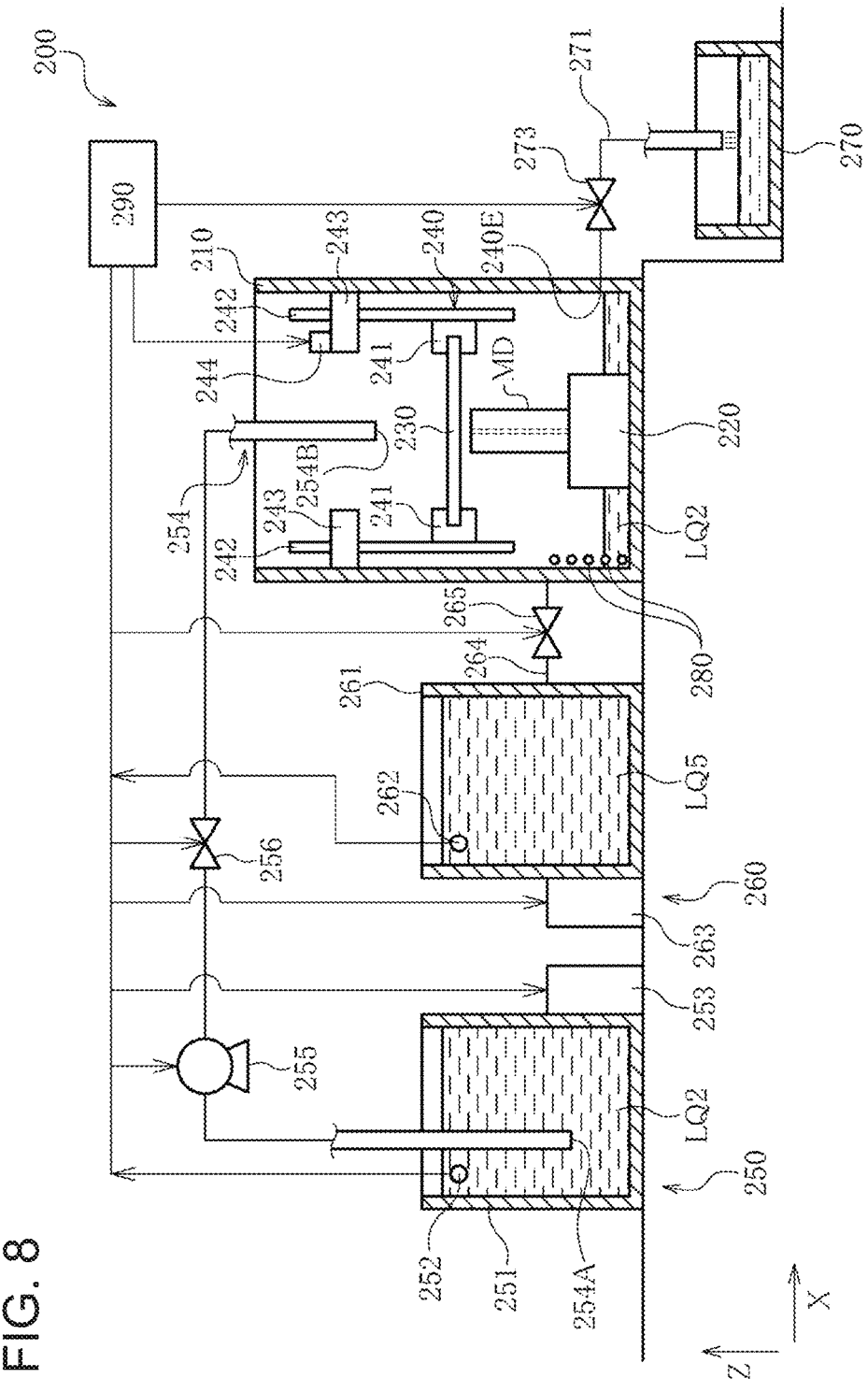
FIG. 8 is an explanatory diagram illustrating an outline of a sponge type cleaning device.
Figure 9:
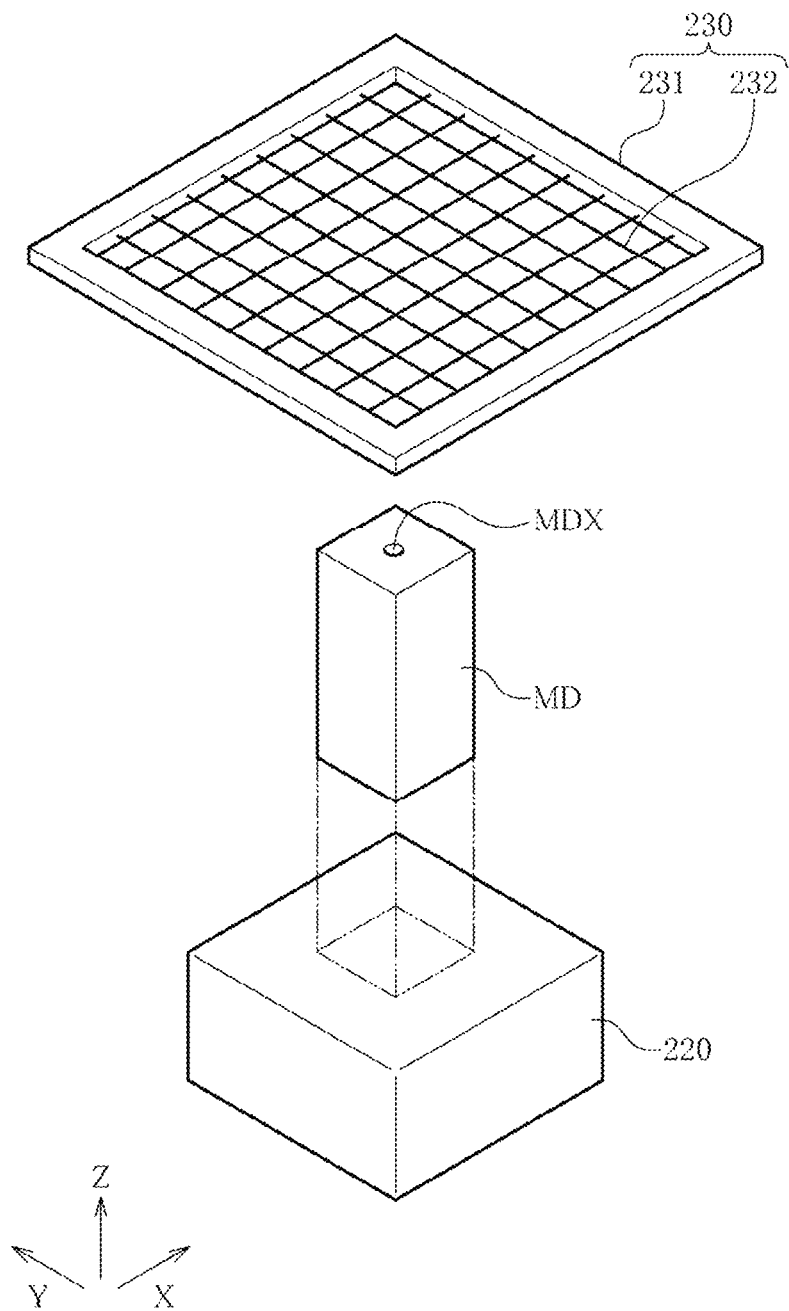
FIG. 9 is an exploded perspective view illustrating an outline of a sponge, a model material, and a sample retaining structure.

As illustrated in FIGS. 8 and 9, the sponge type cleaning device 200 includes a sponge type cleaning tank 210 (a tank), a sponge 220 that is capable of retaining the cleaning agent LQ2 (a liquid substance), a sample retaining structure 230 retaining the model material MD (a sample) to which the support material SP is attached, a movement mechanism 240 (a movement mechanism) enabling the sample retaining structure 230 to be moved freely forward and backward with respect to the sponge 220, a cleaning agent supply mechanism 250 supplying the cleaning agent LQ2 to the sponge type cleaning tank 210, a rinsing liquid supply mechanism 260 supplying a rinsing liquid LQ5 to the sponge type cleaning tank 210, a waste liquid containing tank 270 containing water discharged from the sponge type cleaning tank 210, a liquid level sensor 280 provided in the sponge type cleaning tank 210, and a control mechanism 290 controlling each of the mechanisms 240 to 260.

The sponge type cleaning tank 210 is capable of containing the cleaning agent LQ2 (the liquid substance) or the rinsing liquid LQ5. Then, the sponge 220 is placed on the bottom of the sponge type cleaning tank 210.

The sponge 220 may have an open-cell structure, may be capable of retaining the cleaning agent LQ2, and may be a natural sponge, a synthetic resin sponge, or the like. Examples of the sponge 220 include a urethane sponge, a cellulose sponge, a silicone sponge, a rubber sponge, and the like. In addition, it is preferable that the sponge 220 has elasticity. The sponge 220 is in a rectangular parallelepiped shape, and the ridge line extends in the X direction, the Y direction, and the Z direction.

The model material MD (the sample) is placed on the upper surface of the sponge 220. The model material MD (the sample) is in a rectangular parallelepiped shape, and the ridge line extends in the X direction, the Y direction, and the Z direction. In the model material MD, a through hole MDX extending in an up-and-down direction is formed. A first opening (the lower side) of the through hole MDX faces the sponge 220. A second opening (the upper side) of the through hole MDX is released toward the outside.

The liquid level sensors 280 are disposed at a predetermined interval in a height direction, in the sponge type cleaning tank 210.

The sample retaining structure 230 includes a frame body 231, and a mesh member 232 provided in a hollow portion of the frame body 231. The frame body 231 is horizontally disposed. The mesh member 232 contains a metal, plastics, or the like. The external size of the mesh member 232 may be set to the extent of covering the upper surface of the model material MD. A mesh size of the mesh member 232 may be set such that the cleaning agent LQ2 or the rinsing liquid LQ5 is capable of passing through the mesh.

The movement mechanism 240 includes a frame body retaining member 241 retaining the frame body 231, a vertical arm 242 that is formed to extend in the up-and-down direction (the Z direction) and retains the frame body retaining member 241 in the downward portion, an arm retaining member 243 that is fixed to the sponge type cleaning tank 210 and retains the upward portion of the vertical arm 242 such that the vertical arm 242 is freely moved in the up-and-down direction, and a motor 244 driving a slide movement of the vertical arm 242 with respect to the arm retaining member 243.

It is preferable that the frame body retaining member 241 retains the frame body 231 such that attachment and detachment are freely performed. In a state where the retention of the frame body 231 by the frame body retaining member 241 is released, the model material MD and the sponge 220 are placed in a predetermined position. After that, by the frame body 231 retaining the frame body retaining member 241, predetermined cleaning can be performed.

The motor 244 is driven under the control of the control mechanism 290. By the driving of the motor 244, the vertical arm 242 is moved in the up-and-down direction with respect to the sponge type cleaning tank 210. As a result thereof, the frame body 231 retained in the frame body retaining member 241 is moved in the up-and-down direction with respect to the sponge type cleaning tank 210. Accordingly, the frame body 231 is moved freely forward and backward with respect to the sponge 220.

The cleaning agent supply mechanism 250 supplies the cleaning agent LQ2 to the sponge type cleaning tank 210, and includes a cleaning agent tank 251 containing the cleaning agent LQ2, a cleaning agent temperature sensor 252 measuring the temperature of the cleaning agent LQ2 contained in the cleaning agent tank 251, a cleaning agent temperature regulator 253 adjusting the temperature of the cleaning agent LQ2 contained in the cleaning agent tank 251, cleaning agent piping 254 supplying the cleaning agent LQ2 to the sponge type cleaning tank 210 from the cleaning agent tank 251, and a cleaning agent pump 255 and a cleaning agent valve 256 provided in the cleaning agent piping 254.

The control mechanism 290 measures the temperature of the cleaning agent LQ2 contained in the cleaning agent tank 251 from the cleaning agent temperature sensor 252, and drives the cleaning agent temperature regulator 253, on the basis of the measured temperature. Accordingly, the cleaning agent temperature regulator 253 adjusts the temperature of the cleaning agent LQ2 in a range of lower than a melting point of the model material and higher than or equal to a melting point of the support material.

An inlet 254A of the cleaning agent piping 254 is opened in the cleaning agent LQ2 contained in the cleaning agent tank 251, and an outlet 254B of the cleaning agent piping 254 is opened toward the lower side in the upward portion of the sponge type cleaning tank 210. It is preferable that the outlet 254B of the cleaning agent piping 254 is in the upward position of the sponge 220 placed in the sponge type cleaning tank 210.

The control mechanism 290 detects the height of a liquid level in the sponge type cleaning tank 210 while reading a measured value of the liquid level sensor 280. Further, the control mechanism 290 drives the cleaning agent pump 255 and opens the cleaning agent valve 256. Accordingly, a predetermined amount of cleaning agent LQ2 is sent from the cleaning agent tank 251, and the predetermined amount of cleaning agent LQ2 is supplied to the sponge type cleaning tank 210 from the outlet 254B of the cleaning agent piping 254. Then, the control mechanism 290 reads the measured value of the liquid level sensor 280, and stops the driving of the cleaning agent pump 255 and closes the cleaning agent valve 256 when the liquid level is a predetermined liquid level.

The rinsing liquid supply mechanism 260 supplies the rinsing liquid LQ5 to the sponge type cleaning tank 210, and includes a rinsing liquid tank 261 containing the rinsing liquid LQ5, a rinsing liquid temperature sensor 262 measuring the temperature of the rinsing liquid LQ5 contained in the rinsing liquid tank 261, a rinsing liquid temperature regulator 263 adjusting the temperature of the rinsing liquid LQ5 contained in the rinsing liquid tank 261, rinsing liquid piping 264 supplying the rinsing liquid LQ5 to the sponge type cleaning tank 210 from the rinsing liquid tank 261, and a rinsing liquid valve 265 provided in the rinsing liquid piping 264. Note that, a pump may be provided in the rinsing liquid piping 264.

The control mechanism 290 measures the temperature of the rinsing liquid LQ5 contained in the rinsing liquid tank 261 from the rinsing liquid temperature sensor 262, and drives the rinsing liquid temperature regulator 263, on the basis of the measured temperature. Accordingly, the rinsing liquid temperature regulator 263 adjusts the temperature of the rinsing liquid LQ5 in a range of lower than the melting point of the model material and higher than or equal to the melting point of the support material.

An inlet 264A of the rinsing liquid piping 264 is opened in the rinsing liquid LQ5 contained in the rinsing liquid tank 261, and an outlet 264B of the rinsing liquid piping 264 is opened to the inner wall of the sponge type cleaning tank 210. Note that, it is preferable that the inlet 264A of the rinsing liquid piping 264 is in a position higher than the outlet 264B of the rinsing liquid piping 264. In addition, it is preferable that the outlet 264B of the rinsing liquid piping 264 is opened in a position higher than the liquid level of the cleaning agent LQ2.

The control mechanism 290 detects the height of the liquid level in the sponge type cleaning tank 210 while reading the measured value of the liquid level sensor 280. Further, the control mechanism 290 opens the rinsing liquid valve 265. Accordingly, a predetermined amount of rinsing liquid LQ5 is sent from the rinsing liquid tank 261, and the predetermined amount of rinsing liquid LQ5 is supplied to the sponge type cleaning tank 210 from the outlet 264B of the rinsing liquid piping 264. Then, the control mechanism 290 reads the measured value of the liquid level sensor 280, and closes the rinsing liquid valve 265 when the liquid level is a predetermined liquid level.

The waste liquid containing tank 270 contains the water discharged from the sponge type cleaning tank 210, and is disposed in a position lower than the sponge type cleaning tank 210. In the sponge type cleaning tank 210, an outlet 210E is formed in a position lower than the outlet 264B of the rinsing liquid piping 264. Discharge piping 271 extends toward the waste liquid containing tank 270 from the outlet 210E. In the discharge piping 271, a discharge valve 273 is provided.

Next, the usage of the sponge type cleaning device 200 will be described.

(Sponge Type Cleaning Step)

The control mechanism 290 opens the discharge valve 273, and reads a sensing signal of the liquid level sensor 280. After that, the control mechanism 290 closes the discharge valve 273 when the liquid level is a predetermined liquid level (for example, the liquid level is zero). As described above, the sponge type cleaning tank 210 is in an empty state.

Next, in the sponge type cleaning tank 210, the retention of the frame body 231 by the frame body retaining member 241 is released. Next, the model material MD and the sponge 220 are placed in a predetermined position. After that, the frame body 231 is retained by the frame body retaining member 241. At this time, the frame body 231 and the mesh member 232 are separated from the model material MD.

Next, the control mechanism 290 supplies the cleaning agent LQ2 to the sponge type cleaning tank 210 from the cleaning agent tank 251 until the liquid level is a predetermined liquid level while reading the sensing signal of the liquid level sensor 280, through the driving of the cleaning agent pump 255 and open/close control of the cleaning agent valve 256. Accordingly, the cleaning agent LQ2 supplied to the sponge type cleaning tank 210 is absorbed in the sponge 220. At this time, since the upper portion of the sponge 220 is exposed from the liquid level, and the lower portion is in the cleaning agent LQ2, the cleaning agent LQ2 exists in the lower portion of the sponge 220 (a liquid contact retraction state).

Figure 10A:
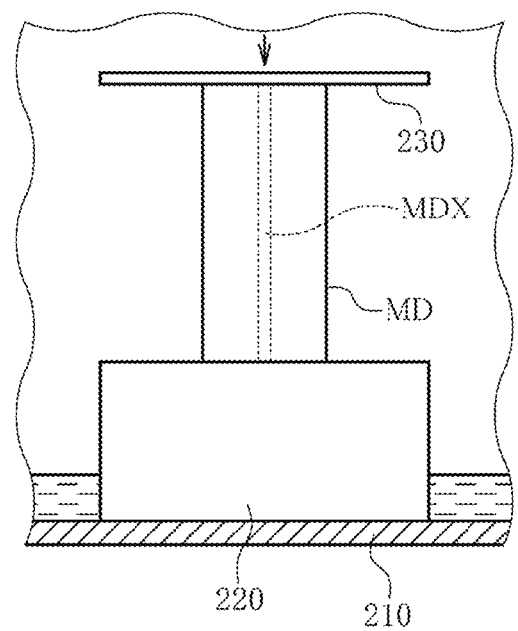
FIG. 10A is a sectional view illustrating an outline of a forward/backward motion of the model material in a sponge type cleaning tank.
Figure 10B:
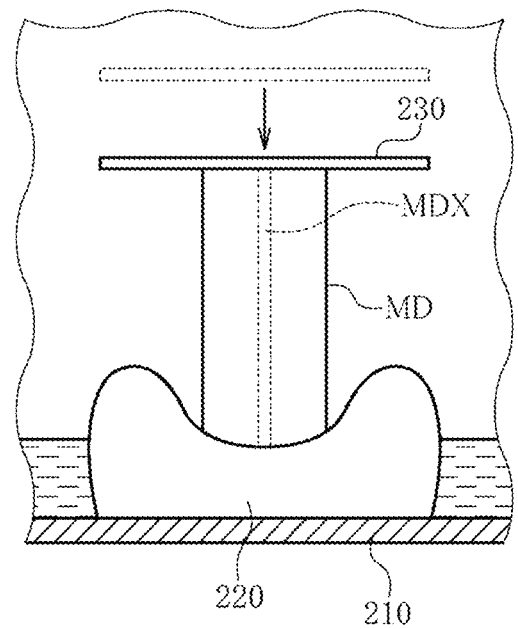
FIG. 10B is a sectional view illustrating an outline of a forward/backward motion of the model material in a sponge type cleaning tank.

After that, the control mechanism 290 drives the motor 244. Accordingly, the sample retaining structure 230 performs a forward/backward motion with respect to the sponge 220. In a case where the sample retaining structure 230 is moved to approach the sponge 220, the model material MD is in a state of being interposed between the mesh member 232 and the sponge 220 (FIG. 10A). In a case where the sample retaining structure 230 further approaches the sponge 220, the model material MD is in a press state of pressing the sponge 220 (FIG. 10B). In a case where the sponge 220 is pressed by the model material MD, the cleaning agent LQ2 in the sponge 220 is supplied up to the upper surface of the sponge 220. As described above, the cleaning agent LQ2 enters the through hole MDX of the model material MD (a liquid contact state).

Here, it is preferable that the cleaning agent LQ2 entering the through hole MDX of the model material MD is in the shape of foam, in consideration of the penetrability of the cleaning agent LQ2 with respect to the fine structure. It is preferable that the size of the foam is smaller than the through hole MDX.

The sample retaining structure 230 is pressed by a predetermined amount, and then, the sample retaining structure 230 is moved to be separated from the sponge 220. Accordingly, the sponge 220 is about to return to the original form, in accordance with the elasticity of the sponge 220. Then, in a case where the sponge 220 is restored (a press retraction state), the upper portion of the sponge 220 is exposed from the liquid level. At this time, the cleaning agent LQ2 in the sponge type cleaning tank 210 or the air around the sponge 220 is sucked in the sponge 220 that is about to return to the original form.

As described above, by repeating the forward/backward motion of the sample retaining structure 230 with respect to the sponge 220, the sponge 220 repeats the elastic deformation and the restoration. Then, by repeating the elastic deformation and the restoration, the sponge 220 is capable of producing the foam of the cleaning agent LQ2 and of supplying the foamy cleaning agent LQ2 to the through hole MDX of the model material MD. By continuously supplying the foamy cleaning agent LQ2 to the through hole MDX of the model material MD, the foamy cleaning agent LQ2 entering from the first opening (the lower side) of the through hole MDX flows out from the second opening (the upper side) of the through hole MDX to the outside. Since the cleaning agent LQ2 entering the through hole MDX contains a cleaning component of the support material, the removal of a substance to be removed that remains in the through hole MDX is accelerated.

Note that, it is preferable that a stroke length of the forward/backward motion is adjusted in accordance with a volume from the first opening to the second opening of the through hole MDX, the height of the first opening and the second opening, or the like.

In addition, a relationship between the height of the sponge 220 (the Z direction) and the liquid level of the cleaning agent LQ2 (the Z direction) may be in a range where the foamy cleaning agent LQ2 can be produced and supplied, and it is preferable that the height of the sponge 220 (the Z direction) is higher than the liquid level of the cleaning agent LQ2 (the Z direction), in consideration of easy intake of the air.

(Sponge Type Rinsing Step)

After that, the control mechanism 290 opens the discharge valve 273 and reads the sensing signal of the liquid level sensor 280. After that, the control mechanism 290 closes the discharge valve 273 when the liquid level is a predetermined liquid level (for example, the liquid level is zero). As described above, the sponge type cleaning tank 210 is in the empty state.

Next, the control mechanism 290 supplies the rinsing liquid LQ5 to the sponge type cleaning tank 210 from the rinsing liquid tank 261 until the liquid level is a predetermined liquid level while reading the sensing signal of the liquid level sensor 280, through open/close control of the rinsing liquid valve 265. Accordingly, the rinsing liquid LQ5 supplied to the sponge type cleaning tank 210 is absorbed in the sponge 220. After that, the control mechanism 290 drives the motor 244. Accordingly, the model material MD performs the forward/backward motion with respect to the sponge 220. By the forward/backward motion, a mixed liquid of the remaining cleaning agent LQ2 and the rinsing liquid LQ5 flows the through hole MDX of the model material MD.

After that, the control mechanism 290 opens the discharge valve 273, sets the sponge type cleaning tank 210 to be in the empty state, and then, supplies again the rinsing liquid LQ5 to the sponge type cleaning tank 210 from the rinsing liquid tank 261, and performs the forward/backward motion of the model material MD with respect to the sponge 220. By repeating such a procedure, the sponge type rinsing step 132 can be performed. Since the behavior of the rinsing liquid LQ5 in the sponge type rinsing step 132 is the same as the behavior of the cleaning agent LQ2 in a sponge type cleaning step 122, the removal of the substance to be removed that remains in the through hole MDX or the cleaning agent LQ2 is accelerated.

Here, it is preferable that the rinsing liquid LQ5 entering the through hole MDX of the model material MD is in the shape of foam, consideration of the penetrability of the rinsing liquid LQ5 with respect to the fine structure.

In the embodiment described above, the sponge 220 is in the rectangular parallelepiped shape, but the invention is not limited thereto, and the sponge may be other columnar bodies, or may be a spherical body, a conical body, or other shapes. In addition, the height of the sponge 220 (the Z direction) may be higher than the height of the first opening and the second opening of the through hole MDX formed in the model material MD.

In the embodiment described above, the through hole MDX formed in the model material MD is in the shape of a line (FIGS. 10A and 10B), but the invention is not limited thereto, and the through hole may be in the shape of a crank (FIG. 11A) in which the through hole MDX is formed from the upper surface to the lower surface of the model material MD, and the through hole MDX is opened to each of the upper surface and the lower surface.

Figure 11A:
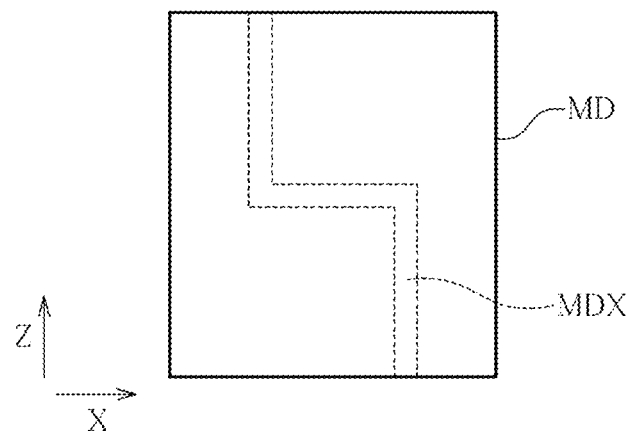
FIG. 11A is an explanatory diagram illustrating an outline of the model material.
Figure 11B:
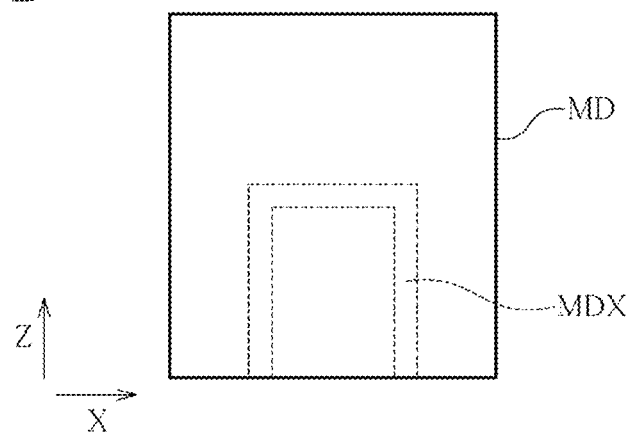
FIG. 11B is an explanatory diagram illustrating an outline of the model material.

In addition, two openings of the through hole MDX may be formed on one surface (in the drawing, the lower surface) in the shape of U (FIG. 11B). In this case, two openings of the through hole MDX may be in contact with the sponge 220, or one of two openings of the through hole MDX may be in contact with the sponge 220, or the other may be opened to the outside. Even though it is not illustrated, the through hole MDX may be in the shape of L.

Figure 11C:
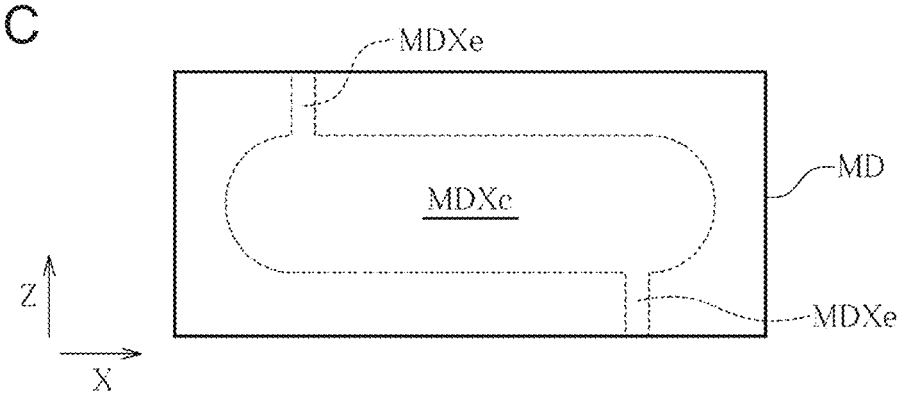
FIG. 11C is an explanatory diagram illustrating an outline of the model material.

Further, in the through hole MDX, the size of the hole may not be constant. For example, as illustrated in FIG. 11C, in a middle portion MDXc of the through hole MDX, the size of the hole may be large or small, compared to an end portion MDXe.

Note that, the model material MD is in a rectangular parallelepiped shape, but the invention is not limited thereto, and the model material may be other columnar bodies, or may be a spherical body, a conical body, or other shapes.

In the embodiment described above, the model material MD is placed on the sponge 220, but the invention is not limited thereto, and the sponge 220 may be placed on the model material MD, within the scope of the invention.

In the embodiment described above, the model material MD is moved with respect to the sponge 220, but the invention is not limited thereto, and the sponge 220 may be moved with respect to the model material MD in the up-and-down direction.

In the embodiment described above, the up-and-down direction (a vertical direction) is adopted as a relative movement direction between the sponge 220 and the model material MD, but the invention is not limited thereto, and a horizontal direction or an oblique direction may be adopted, within the scope of the invention.

In the embodiment described above, the sponge type cleaning device 200 such as the sample retaining structure 230 and the movement mechanism 240 is used in a relative movement between the sponge 220 and the model material MD, but the invention is not limited thereto, and the relative movement between the sponge 220 containing the cleaning liquid LQ2 and the model material MD may be performed manually.

In the embodiment described above, the movement mechanism 240 functions as a sponge deformation structure, but the invention is not limited thereto.

Next, a modification example of the sponge type cleaning device 200 will be described. As illustrated in FIG. 12A, a sponge type cleaning device 600 includes a pouch 610 (a tank), the cleaning agent LQ2 contained in the pouch 610, and the sponge 220 contained in the pouch 610.

The temperature of the cleaning agent LQ2 is adjusted in a predetermined temperature range. The temperature of the cleaning agent LQ2 may be adjusted before the cleaning agent is supplied to a sealed type cleaning container 800, or may be adjusted after the cleaning agent is supplied to the sealed type cleaning container 800.

The pouch 610 contains a flexible material, and thus, can be deformed in accordance with the impartment of an external force. That is, the entire pouch 610 can be deformed. It is preferable that the sponge 220 contained in the pouch 610 can be deformed in accordance with the deformation of the pouch 610. It is preferable that the pouch 610 contains plastics and has light transmissivity. In addition, it is preferable that the thickness is thin, from the viewpoint of the ease of a deformation operation.

The entire cleaning agent LQ2 contained in the pouch 610 is retained in the sponge 220.

Figure 12B:
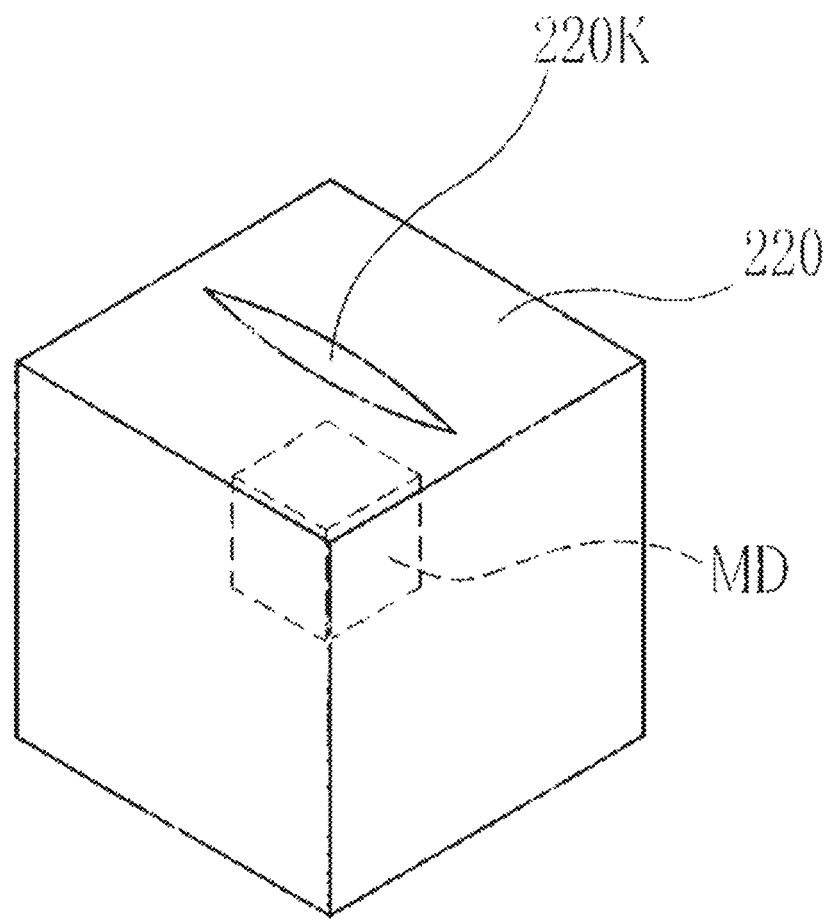
FIG. 12B is a perspective view illustrating an outline of the sponge.

As illustrated in FIG. 12B, the sponge 220 is formed in a rectangular parallelepiped shape, and a cut 220K is formed on the upper surface. The model material MD (the sample) to which the support material SP is attached is inserted to the cut 220K.

The pouch 610 is deformed by imparting an external force to the pouch 610 with a hand. Accordingly, the sponge 220 contained in the pouch 610 is elastically deformed. On the other hand, in a case where the impartment of the external force is released, the sponge 220 is restored. As described above, by repeating the impartment of the external force and the release of the external force, the sponge 220 repeats the elastic deformation and the restoration. By repeating the elastic deformation and the restoration, the sponge 220 is capable of producing the foam of the cleaning agent LQ2 and of supplying the foamy cleaning agent LQ2 to the through hole of the model material MD. By continuously supplying the foamy cleaning agent LQ2 to the through hole of the model material MD, the removal of the substance to be removed that remains in the through hole is accelerated.

Figure 12C:
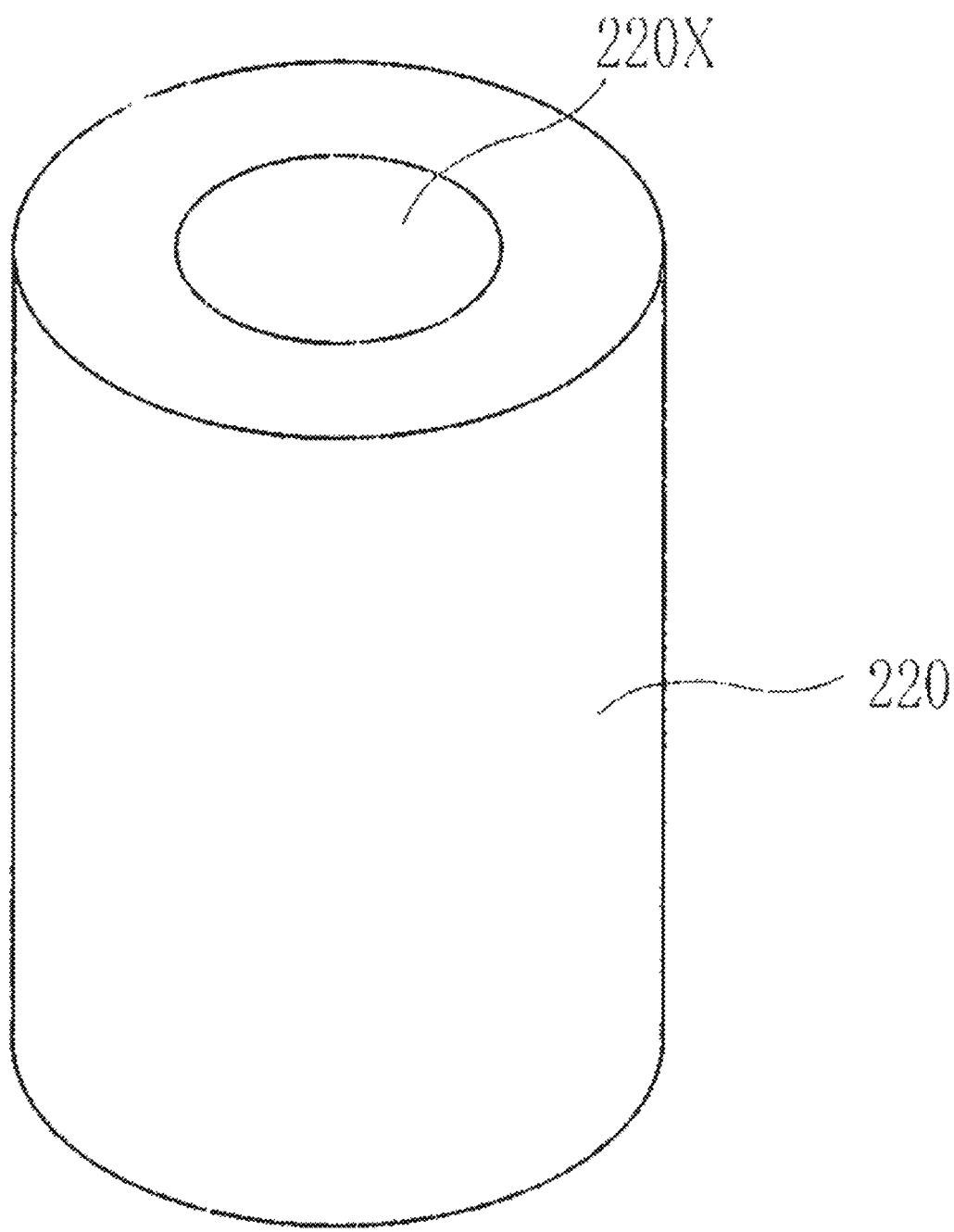
FIG. 12C is a perspective view illustrating an outline of the sponge.

In the embodiment described above, the rectangular parallelepiped sponge 220 is used, but the invention is not limited thereto. For example, a cylindrical sponge 220 (FIG. 12C) may be used. Then, in a state where the sample is contained in a hollow portion 220X of the cylindrical sponge 220, the elastic deformation and the restoration of the sponge 220 containing the cleaning agent LQ2 may be repeatedly performed.

Figure 12D:
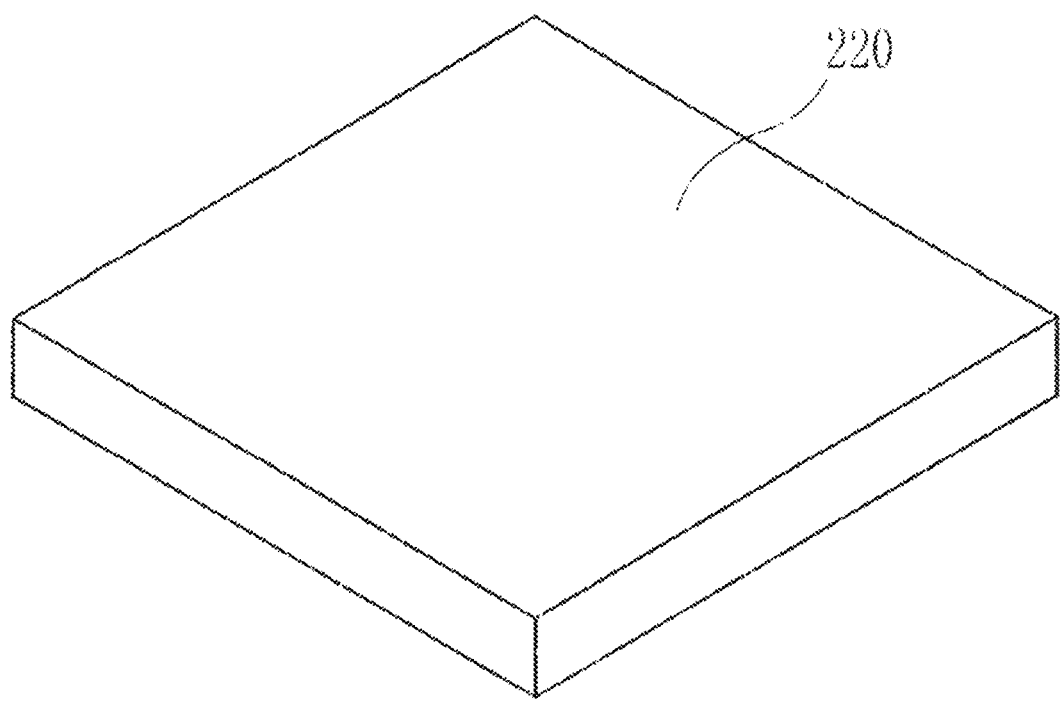
FIG. 12D is a perspective view illustrating an outline of the sponge.

Note that, a sheet-shaped sponge 220 (FIG. 12D) may be used as the sponge. In a state where the sheet-shaped sponge 220 surrounds the sample, the elastic deformation and the restoration of the sponge 220 may be repeatedly performed.

Figure 12E:
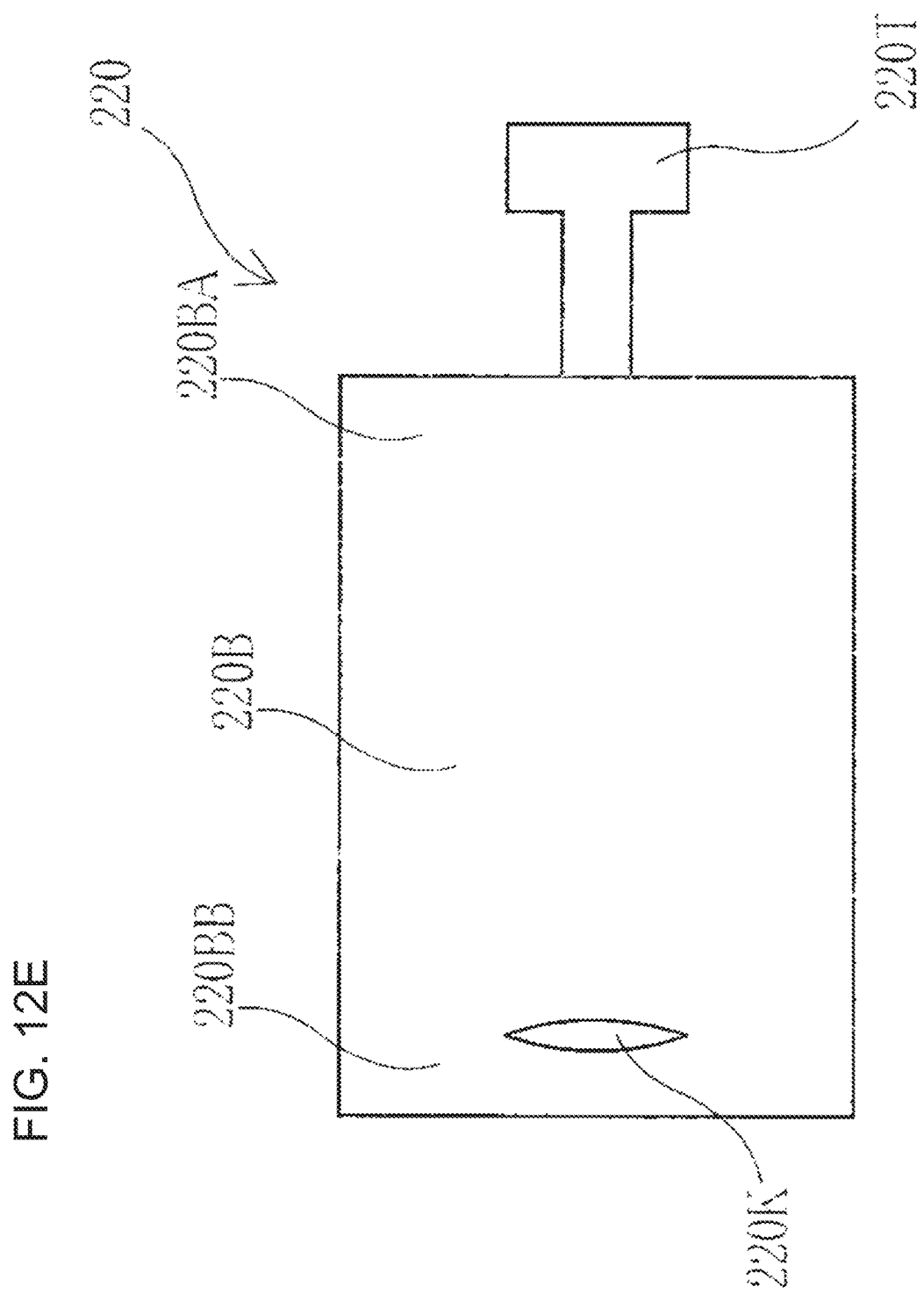
FIG. 12E is a plan view illustrating an outline of the sponge.
Figure 12F:
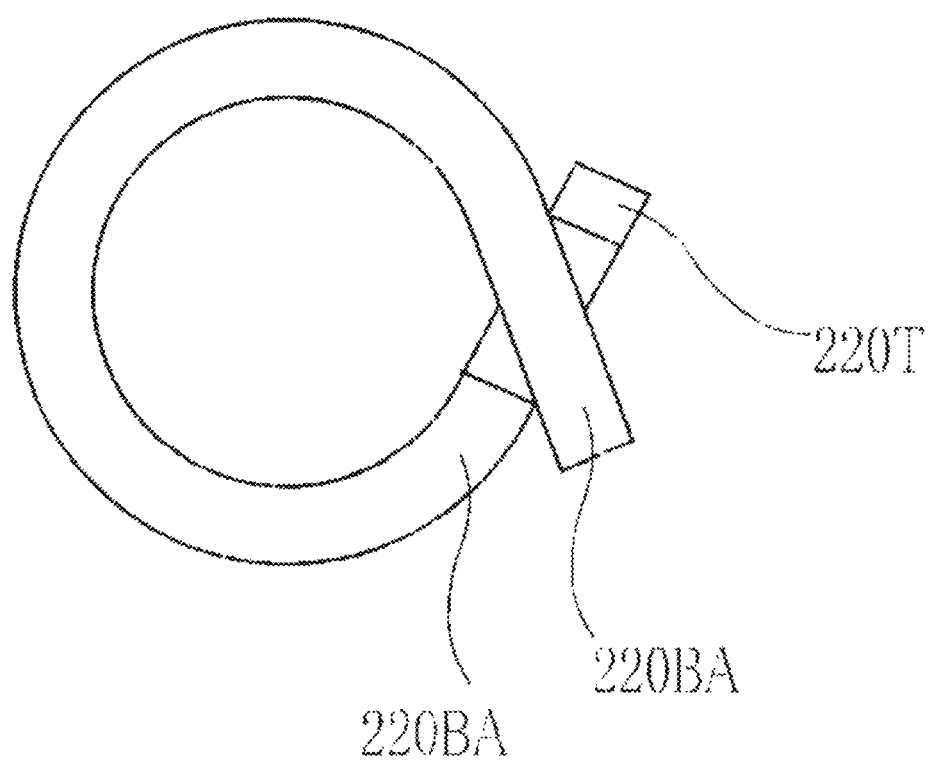
FIG. 12F is a side view illustrating an outline of the sponge.

Further, the sheet-shaped sponge 220 may include a sheet-shaped sponge main body 220B, one end portion 220BA of a sponge main body 221 on which a protrusion 220T (a first engagement portion) is formed, and the other end portion 220BB of the sponge main body 221 on which the cut 220K (a second engagement portion) is formed (FIG. 12E). The protrusion 220T can be engaged/disengaged with respect to the cut 220K. In a case where the protrusion 220T is engaged with the cut 220K, the sponge main body 220B is in the shape of a cylinder (FIG. 12F). Then, the sample is disposed in the hollow portion 220X.

Figure 12G:
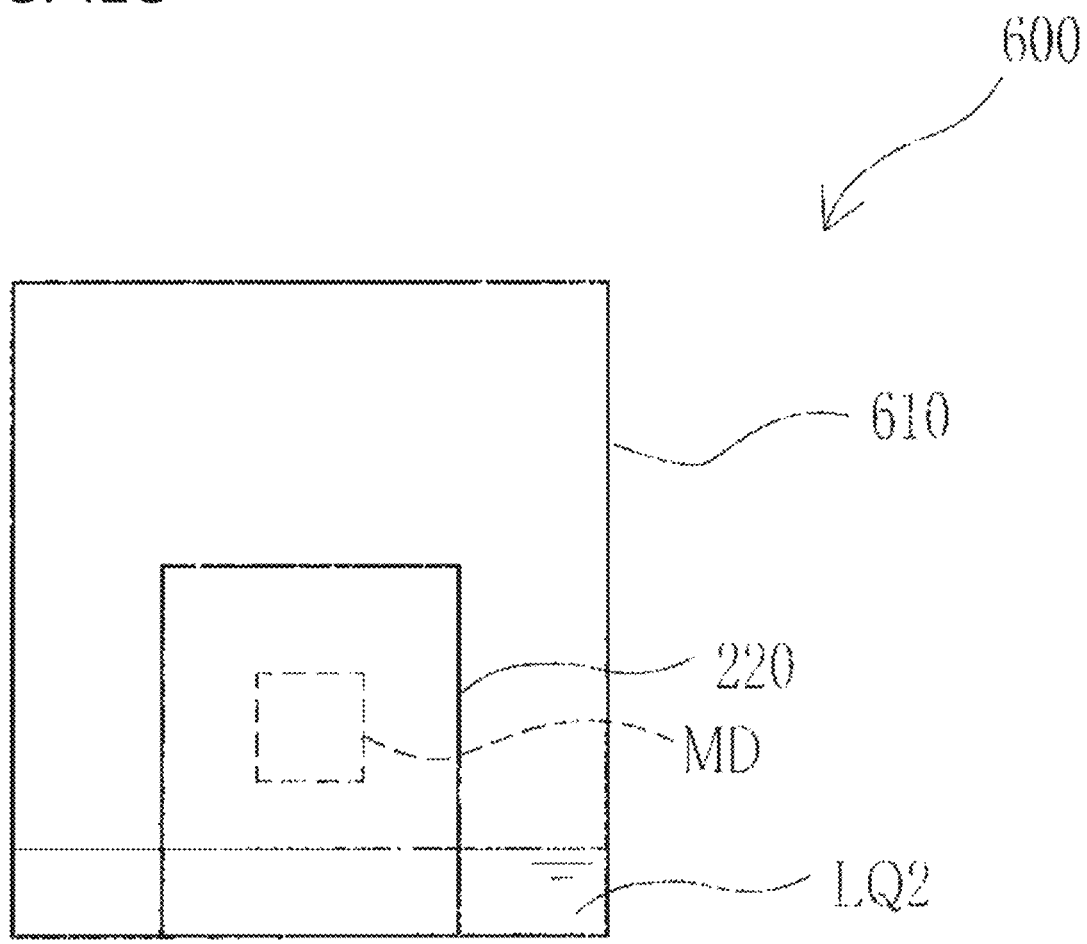
FIG. 12G is an explanatory diagram illustrating an outline of the sponge type cleaning device.

Note that, a part of the cleaning agent LQ2 contained in the pouch 610 may be retained in the sponge 220, and the remainder may be stored in the pouch 610 (FIG. 12G).

In the embodiment described above, an example of the sponge type cleaning step 122 has been described, and the example can also be used in the sponge type rinsing step 132. That is, since the behavior of the rinsing liquid LQ5 in the sponge type rinsing step 132 is the same as the behavior of the cleaning agent LQ2 in the sponge type cleaning step 122, the removal of the substance to be removed that remains in the through hole or the cleaning agent LQ2 is accelerated.

In the embodiment described above, the entire pouch 610 can be deformed, but the invention is not limited thereto, and a part of the pouch 610 may be a deformable portion, or a part of the sponge type cleaning tank 210 may be a deformable portion, and the sponge 200 contained in the sponge type cleaning tank 210 may be deformed by changing the deformable portion.

Note that, in the cleaning method 100 (FIG. 7) of the sample having a fine structure, a water wheel type cleaning step using a water wheel type cleaning device 300 may be performed instead of the sponge type cleaning step 222. In addition, a water wheel type rinsing step using the water wheel type cleaning device 300 may be performed instead of the sponge type rinsing step 223.

Next, the water wheel type cleaning device 300 will be described.

Figure 13A:
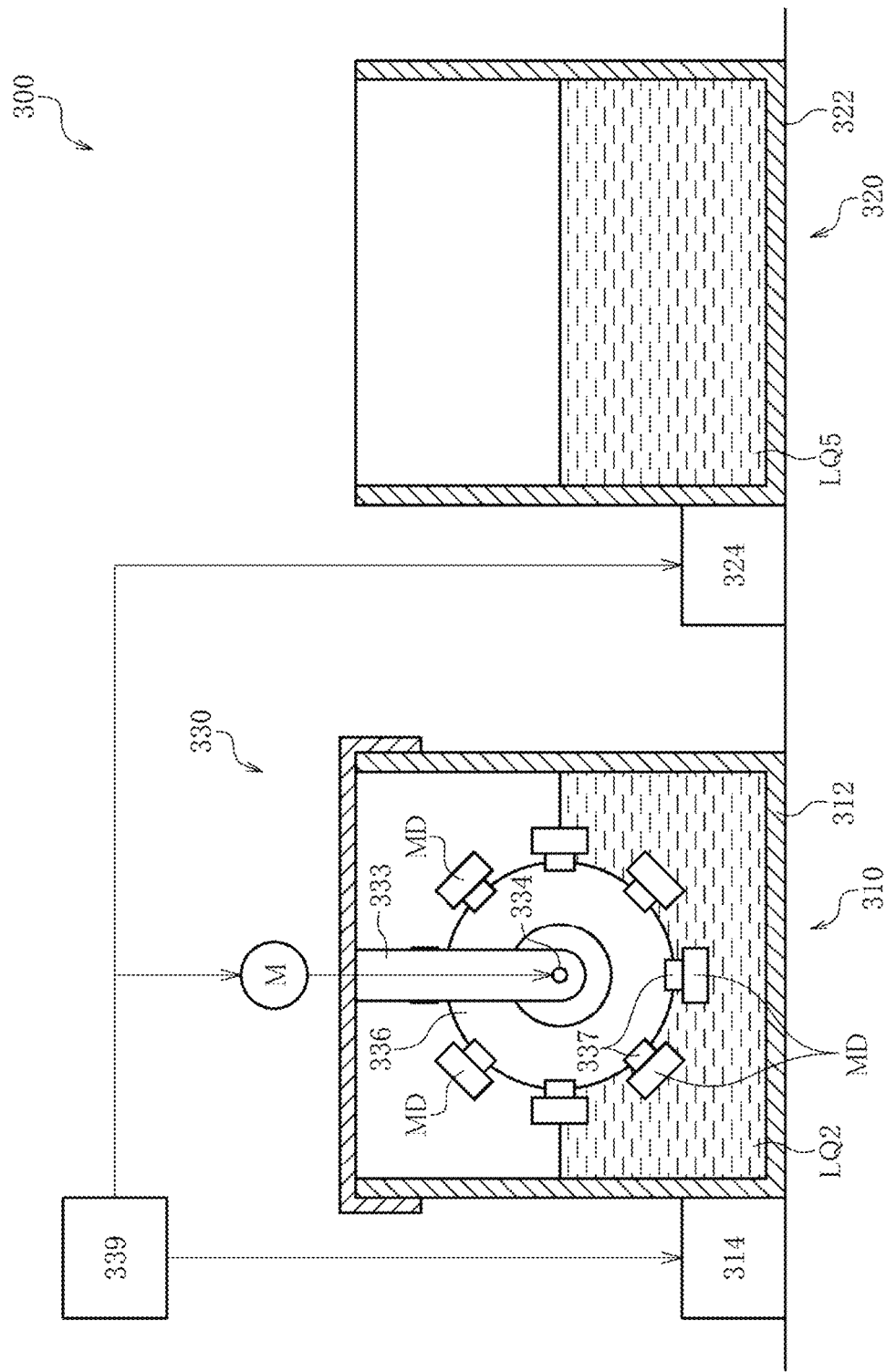
FIG. 13A is an explanatory diagram illustrating an outline of a water wheel type cleaning device.
Figure 13B:
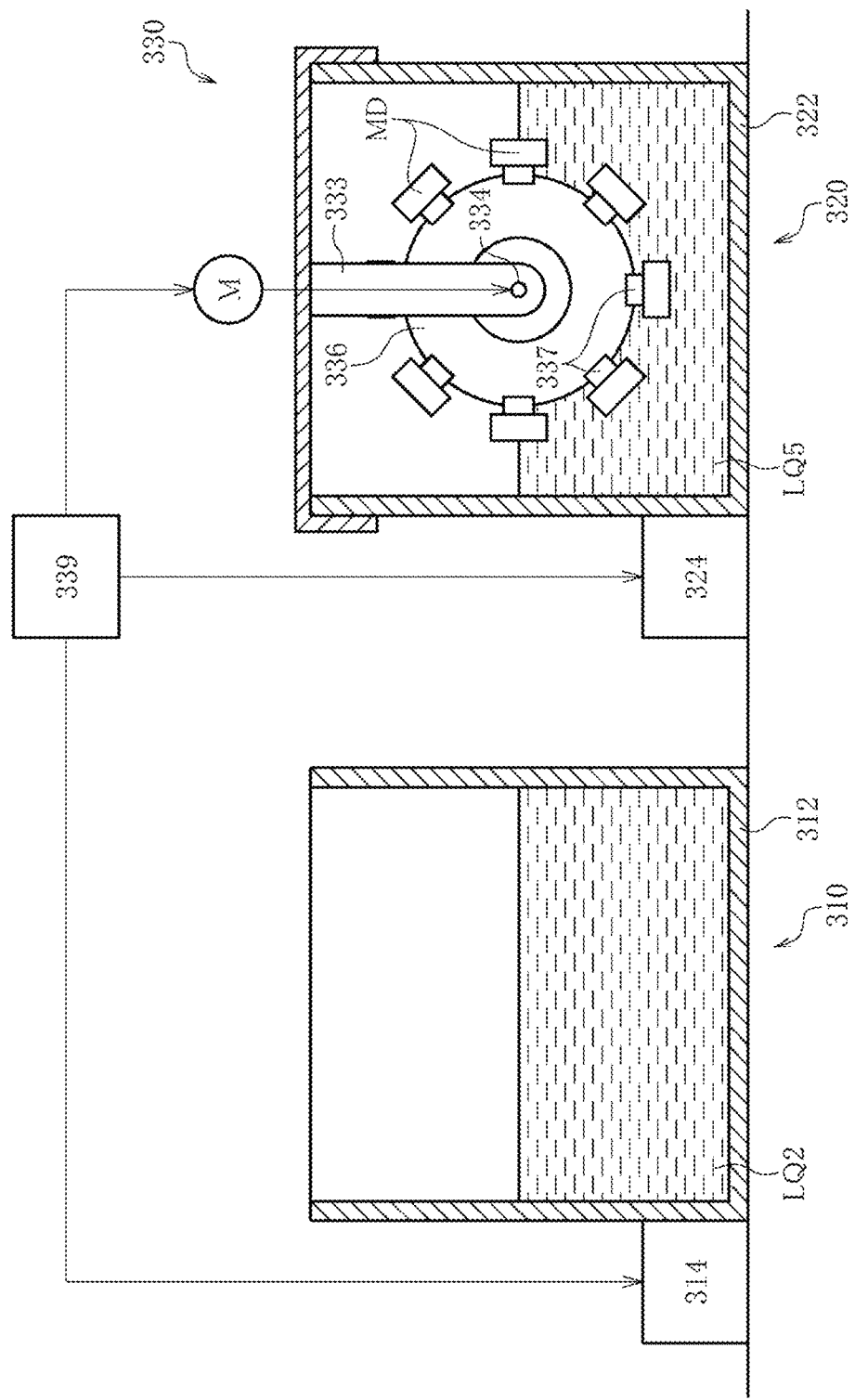
FIG. 13B is an explanatory diagram illustrating an outline of the water wheel type cleaning device.

As illustrated in FIGS. 13A to 13B, the water wheel type cleaning device includes a water wheel type cleaning tank unit 310, a water wheel type rinsing tank unit 320, and a lid unit 330.

The water wheel type cleaning tank unit 310 includes a water wheel type cleaning tank 312 containing the cleaning agent LQ2, and a cleaning agent temperature regulator 314 adjusting the temperature of the cleaning agent LQ2 contained in the water wheel type cleaning tank 312.

The water wheel type rinsing tank unit 320 includes a water wheel type rinsing tank 322 containing the rinsing liquid LQ5, and a cleaning agent temperature regulator 324 adjusting the temperature of the cleaning agent LQ2 contained in the water wheel type cleaning tank 312.

The lid unit 330 includes a lid 332, a water wheel arm 333 extending downward from the lower surface of the lid 332, a horizontal shaft 334 provided on the tip end of the water wheel arm 333 to be freely turned, a water wheel 336 axially attached to the horizontal shaft 334, chuck members 337 provided at a predetermined interval on the circumferential surface of the water wheel 336, a motor 338 rotating or turning the horizontal shaft 334 around the shaft line of the horizontal shaft 334, and a control mechanism 339 controlling each unit.

The lid 332 closes the opening of the water wheel type cleaning tank 312 or the water wheel type rinsing tank 322, and is freely attached and detached with respect to the opening portion of the water wheel type cleaning tank 312 or the water wheel type rinsing tank 322.

Since the water wheel type rinsing tank 322 has the same structure as that of the water wheel type cleaning tank 312, in the following detailed description of the lid unit 330, the lid unit will be described by using the water wheel type cleaning tank 312.

When the lid 332 is mounted on the opening portion of the water wheel type cleaning tank 312, the water wheel arm 333 extends toward the water wheel type cleaning tank 312, and the horizontal shaft 334 is directed toward the horizontal direction.

The chuck member 337 is capable of retaining the model material MD and of releasing the retention.

In a case where the control mechanism 339 drives the motor 338, the water wheel 336 is rotated or turned around the horizontal shaft 334 in forward and reverse directions. A movement locus of the model material MD retained in the chuck member 337 is in the shape of a circle or a circular arc around the horizontal shaft 334. The liquid level of the cleaning agent LQ2 contained in the water wheel type cleaning device 300 intersects with the movement locus of the model material MD. That is, the model material MD is freely switched between a dipping state of being in the cleaning agent LQ2 and a retraction state that is retracted from the dipping state, in accordance with the driving of the motor 338. Note that, when the model material MD approaches the liquid level, it is preferable that the opening portion opened by the through hole MDX approaches the liquid level.

(Water Wheel Type Cleaning Rinsing Step)

Figure 14A:
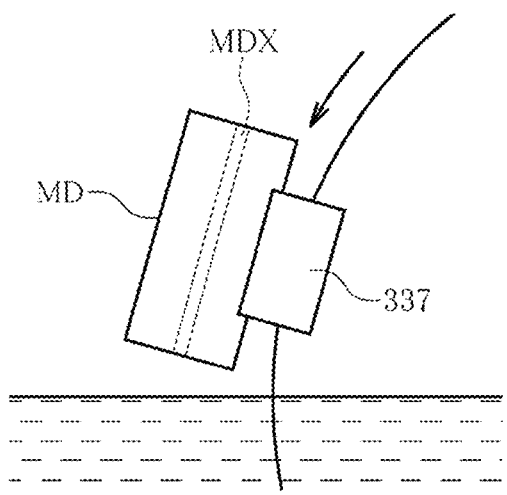
FIG. 14A is an explanatory diagram illustrating an outline of a motion of the model material in the water wheel type cleaning device.
Figure 14B:
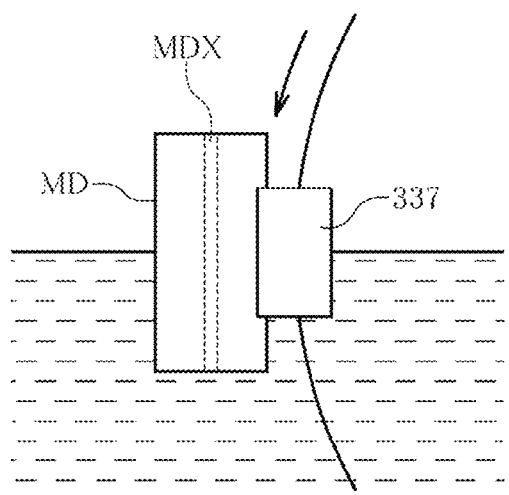
FIG. 14B is an explanatory diagram illustrating an outline of a motion of the model material in the water wheel type cleaning device.
Figure 14C:
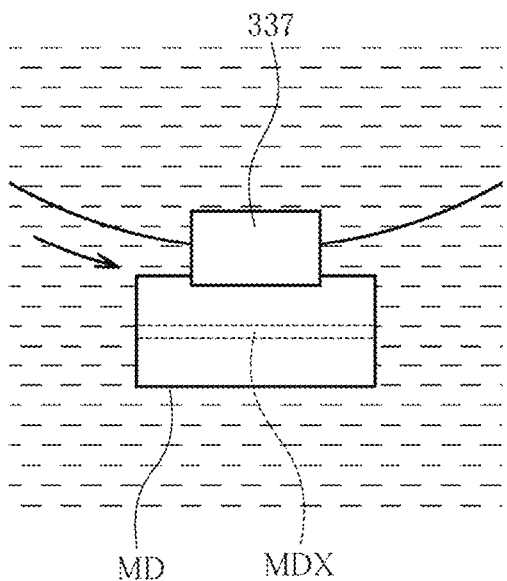
FIG. 14C is an explanatory diagram illustrating an outline of a motion of the model material in the water wheel type cleaning device.
Figure 14D:
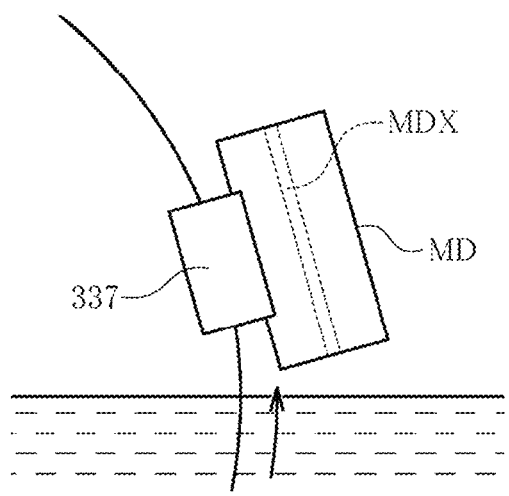
FIG. 14D is an explanatory diagram illustrating an outline of a motion of the model material in the water wheel type cleaning device.

In a case where the lid 332 is mounted on the water wheel type cleaning tank 312 in which the cleaning agent LQ2 is contained, the downward portion of the water wheel 336 is dipped in the cleaning agent LQ2, and the upward portion is up from the liquid level of the cleaning agent LQ2. In a case where the motor 338 is driven, under the control of the control mechanism 339, the water wheel 336 is rotated or turned in the forward and reverse directions (FIGS. 14A, 14B and 14C). As a result thereof, the model material MD retained in the chuck member 337 is freely switched between the dipping state of being in the cleaning agent LQ2 and the retraction state that is retracted from the dipping state. At this time, when the model material MD approaches the liquid level of the cleaning agent LQ2, the air in the vicinity of the liquid level of the cleaning agent LQ2 is mixed in solution, and thus, foam occurs in the vicinity of the liquid level of the cleaning agent LQ2. The foamy cleaning agent LQ2 penetrates through the downward hole of the through hole MDX provided in the model material MD (FIGS. 14A to 14B). After that, the model material MD advances through the cleaning agent LQ2 (FIG. 14C), and then, exits from the cleaning agent LQ2 (FIG. 14D). At this time, the cleaning agent LQ2 entering the through hole MDX flows out from the downward hole. As described above, the cleaning in the through hole MDX is performed.

(Water Wheel Type Rinsing Step)

In a case where the lid 332 is mounted on the water wheel type rinsing tank 322 in which the rinsing liquid LQ5 is contained, the downward portion of the water wheel 336 is dipped in the rinsing liquid LQ5, and the upward portion is up from the liquid level of the rinsing liquid LQ5. In a case where the motor 338 is driven, under the control of the control mechanism 339, the water wheel 336 is rotated or turned in the forward and reverse directions. As a result thereof, the model material MD retained in the chuck member 337 is freely switched between a dipping state of being in the rinsing liquid LQ5 and a retraction state that is retracted from the dipping state. At this time, when the model material MD approaches the liquid level of the rinsing liquid LQ5, the air in the vicinity of the liquid level of the rinsing liquid LQ5 is mixed in solution, and thus, foam occurs in the vicinity of the liquid level of the rinsing liquid LQ5. The foamy rinsing liquid LQ5 penetrates through the downward hole of the through hole MDX provided in the model material MD. After that, the model material MD advances through the rinsing liquid LQ5 (FIG. 14C), and then, exits from the rinsing liquid LQ5. At this time, the rinsing liquid LQ5 entering the through hole MDX flows out from the downward hole. As described above, the rinsing in the through hole MDX is performed.

Figure 15:
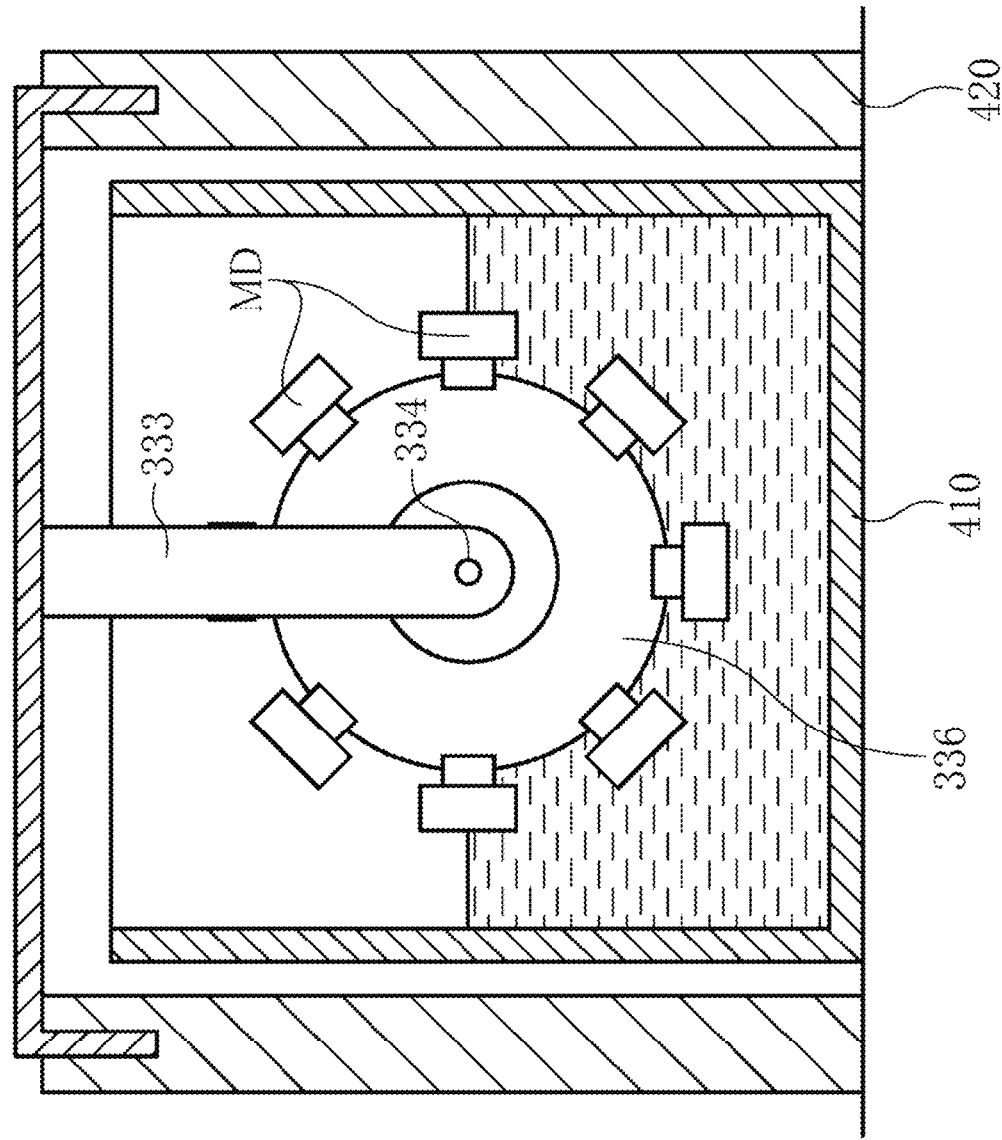
FIG. 15 is an explanatory diagram illustrating an outline of the water wheel type cleaning device.

In the water wheel type cleaning rinsing step and the water wheel type cleaning rinsing step of the embodiment described above, the lid 332 is provided on the water wheel type rinsing tank 322 or the water wheel type cleaning tank 312, but the invention is not limited thereto, and as illustrated in FIG. 15, the lid can be used with respect to an ultrasonic cleaning machine 410 with a built-in heater. In this case, the lid 332 may be mounted on an external cylinder 420 disposed to surround the ultrasonic cleaning machine 410, instead of the water wheel type rinsing tank 322 or the water wheel type cleaning tank 312. In a case where the lid 332 is mounted, the downward portion of the water wheel 336 is dipped in the cleaning agent LQ2 or the rinsing liquid LQ5 in the ultrasonic cleaning machine 410, and the upward portion is up from the liquid level. In such a state, the water wheel type cleaning rinsing step and the water wheel type cleaning rinsing step can be performed in accordance with the driving of the motor 338, under the control of the control mechanism 339.

In the embodiment described above, the movement locus of the sample is in the shape of a circle or a circular arc around the horizontal shaft 334, and may be in the shape of a line insofar as a state in solution and a state out of solution can be switched, that is, insofar as a part of the movement locus is in the liquid substance and the remainder is out of the liquid substance. For example, in the gist of the invention, the sample may perform a reciprocation motion in the up-and-down direction (the Z direction) or the oblique direction.

Note that, in the cleaning method 100 (FIG. 7) in the case of the model material MD having a fine structure, the sealed type cleaning step using the sealed type cleaning container 800 may be performed instead of the water wheel type cleaning step using the water wheel type cleaning device 300. In addition, the sealed type rinsing step using the sealed type cleaning container 800 may be performed instead of the water wheel type rinsing step using the water wheel type cleaning device 300.

Figure 16:
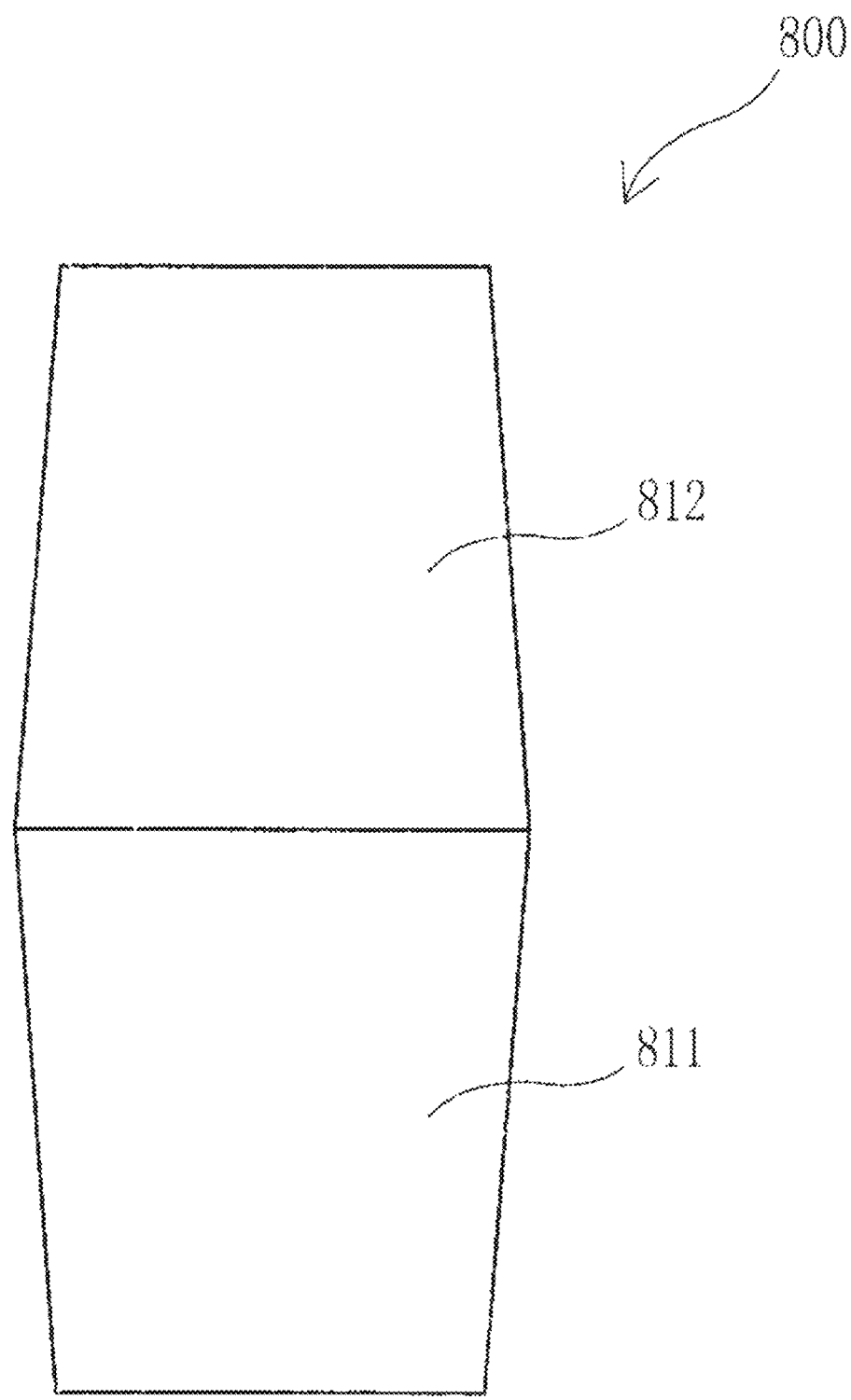
FIG. 16 is a side view illustrating an outline of a sealed type cleaning container.
Figure 17:
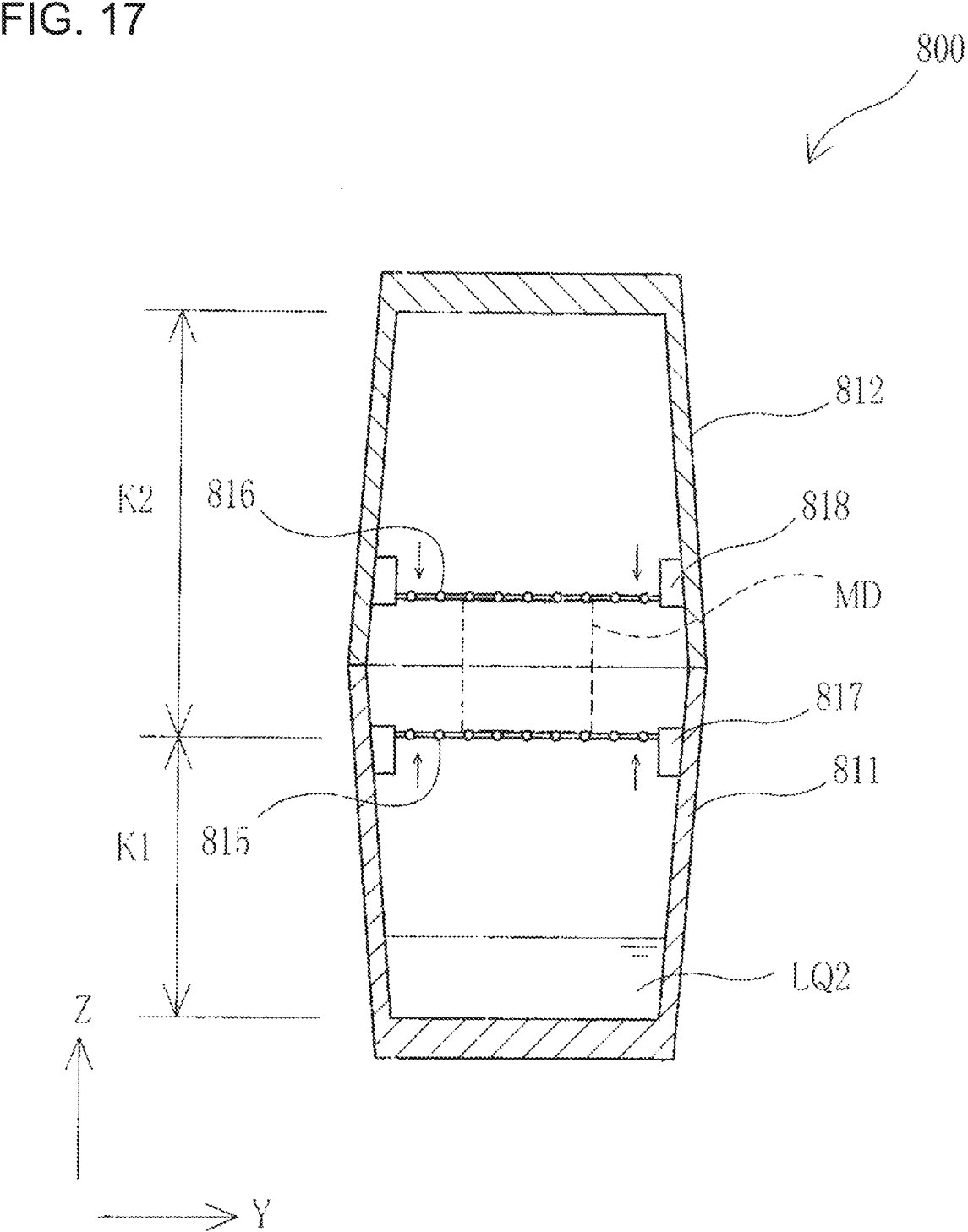
FIG. 17 is a sectional view illustrating an outline of the sealed type cleaning container.

As illustrated in FIGS. 16 to 17, the sealed type cleaning container 800 includes a lower tank 811 containing the cleaning agent LQ2, an upper tank 812 disposed on the lower tank 811, and a filter 815 and a filter 816 for retaining the model material MD (the sample) to which the support material is attached.

The lower tank 811 and the upper tank 812 are a bottomed cylindrical body. The upper tank 812 is positioned above the lower tank 811. An opening of the lower tank 811 is directed upward, and an opening of the upper tank 812 is directed downward. Since the opening of the lower tank 811 and the opening of the upper tank 812 have the same shape and the same dimension, a sealed container is formed by allowing the opening of the lower tank 811 and the opening of the upper tank 812 to face each other.

The filter 815 is provided in a containing space of the lower tank 811. The filter 815 partitions the containing space of the lower tank 811 and the upper tank 812 into two containing spaces. The containing space below the filter 815 is defined as a first containing space K1, and the containing space above the filter 815 is defined as a second containing space K2. The filter 816 is provided in the second containing space K2. Each of the filters 815 and 816 is formed into the shape of a sheet, and the mesh is smaller than the model material MD. Accordingly, the filters 815 and 816 are capable of allowing the pass of the cleaning agent LQ2 and of controlling the pass of the model material MD. In the case of allowing the opening of the lower tank 811 and the opening of the upper tank 812 to face each other, the filters 815 and 816 face each other in positions separated at a predetermined interval.

The filter 815 is retained by a lower tank retaining member 817 provided in the lower tank 811. In the lower tank retaining member 817, a rail groove extending in the Z direction is provided. By the rail groove, the filter 815 is freely moved in the Z direction. Further, in the rail groove, a coil spring (a filter biasing member) is provided. In this case, the filter 815 is biased toward the upper side in the Z direction. Similarly, the filter 816 is retained by an upper tank retaining member 818 provided in the upper tank 812. In the upper tank retaining member 818, a rail groove extending in the Z direction is provided. By the rail groove, the filter 816 is freely moved in the Z direction. Further, in the rail groove, a coil spring (a filter biasing member) is provided. Accordingly, the filter 816 is biased toward the lower side in the Z direction. Note that, in a case where the coil spring is not provided in the rail groove, an anchorage for positioning the filter may be provided.

The temperature of the cleaning agent LQ2 is adjusted in a predetermined temperature range. The temperature of the cleaning agent LQ2 may be adjusted before the cleaning agent is supplied to the sealed type cleaning container 800, or may be adjusted after the cleaning agent is supplied to the sealed type cleaning container 800.

In a case where the sealed type cleaning container 800 is held by a hand and shaken in the up-and-down direction, the cleaning agent LQ2 performs the reciprocation motion between the lower tank 811 and the upper tank 812 through the filters 815 and 816. The model material MD collides with the cleaning agent LQ2 that performs the reciprocation motion. At this time, when the model material MD approaches the liquid level of the cleaning agent LQ2, the air in the vicinity of the cleaning agent LQ2 is mixed in solution, and thus, the liquid cleaning agent LQ2 including the foam is obtained. In addition, in a case where the mesh of the filter is fine, the foam is also produced by passing through the filter. Then, since the foamy cleaning agent LQ2 is supplied to the through hole provided in the model material MD, the cleaning in the through hole is performed.

Note that, any one of the filters 815 and 816 may be a plate-shaped member but not a filter.

Figure 18A:
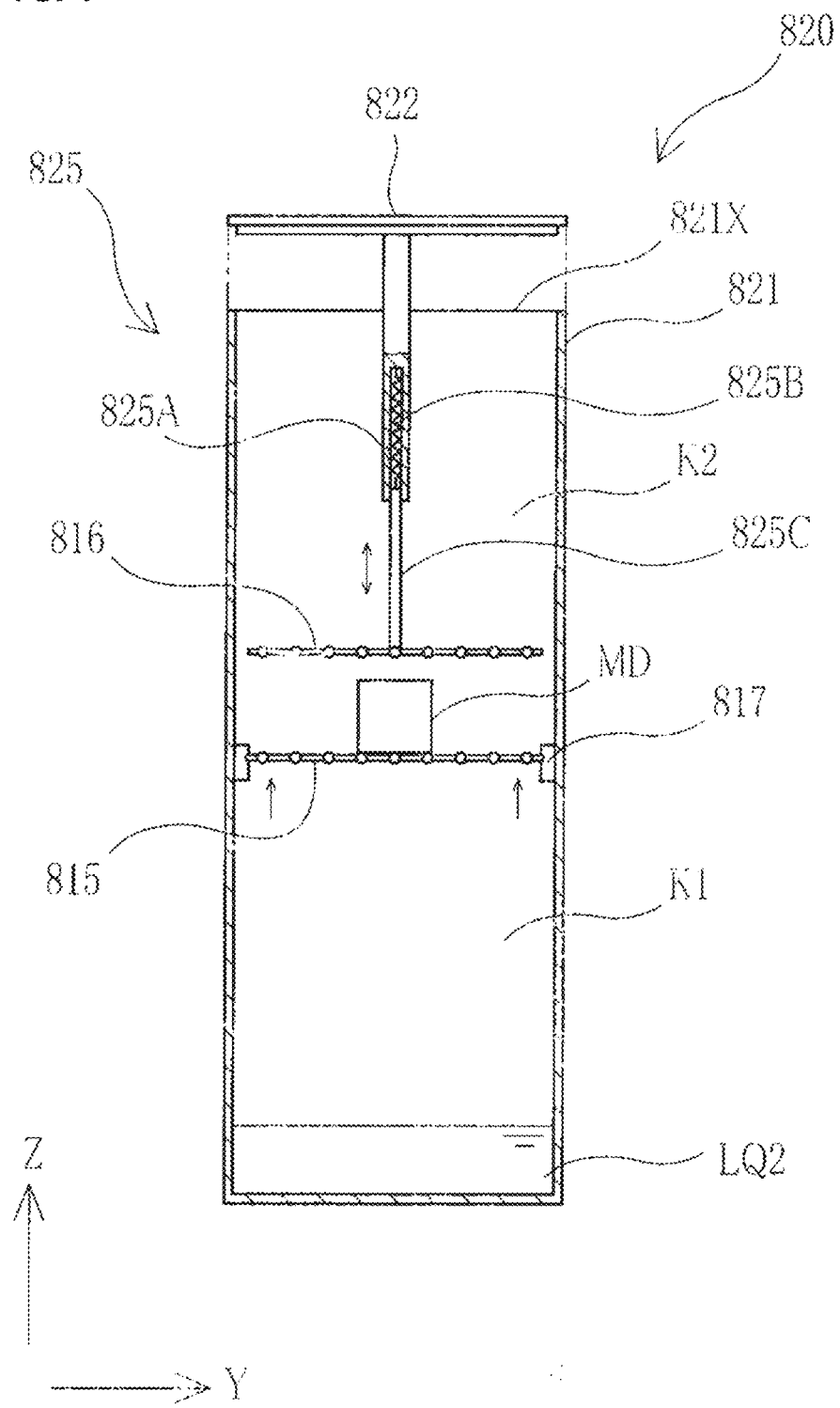
FIG. 18A is a sectional view illustrating an outline of the sealed type cleaning container.
Figure 18B:
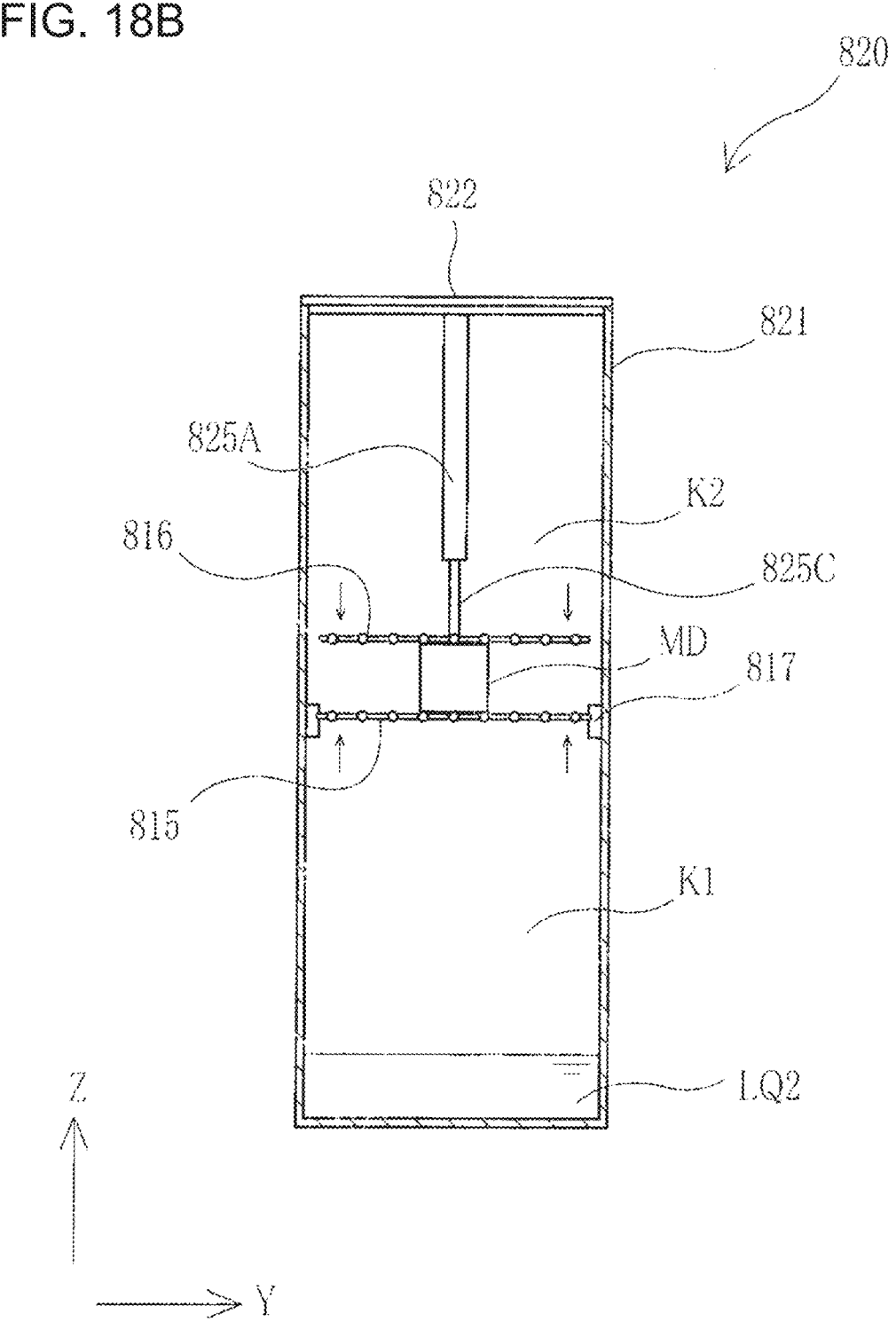
FIG. 18B is a sectional view illustrating an outline of the sealed type cleaning container.

Next, a modification example of the sealed type cleaning container will be described. As illustrated in FIGS. 18A and 18B, a sealed type cleaning container 820 includes a bottomed cylindrical container 821, a lid 822 freely closing an opening 821X formed in the cylindrical container 821, the filter 815 provided in the cylindrical container 821, the lower tank retaining member 817 fixing the filter 815, the filter 816 for fixing the model material MD (the sample), and a filter anchorage 825 fixing the filter 816.

The filter 815 is provided in the middle portion of a containing space K of the cylindrical container 821. The filter 815 partitions the containing space of the cylindrical container 821 into the containing space K1 below the filter 815 and the containing space K2 above the filter 815. The model material MD (the sample) is contained in the containing space K2. The cleaning agent LQ2 is stored in the cylindrical container 821.

The filter anchorage 825 includes a protrusion cylinder 825A erected from the inner surface of the lid 822, a coil spring 825B contained in the protrusion cylinder 825A, and a rod 825C of which the base end portion is inserted to an opening of the protrusion cylinder 825A. In a state where the base end portion is inserted to the protrusion cylinder 825A, the rod 825C is freely moved in the Z direction. The coil spring 825B biases the rod 825C toward the down direction (a direction in which the tip end portion of the rod 825C is away from the lid 822).

In a case where the lid 822 is mounted on the opening 821X, the filter 816 abuts to the model material MD. Since the filter 816 is biased toward the down direction by the coil spring 825B, in a case where the lid 822 is mounted on the opening 821X, the filter 816 presses the model material MD against the filter 815 side. Accordingly, the model material MD is retained by the filter 815 and the filter 816.

In a case where the sealed type cleaning container 820 is held by a hand and shaken in the up-and-down direction, the cleaning agent LQ2 performs the reciprocation motion between the containing spaces K1 and K2. The model material MD collides with the cleaning agent LQ2 that performs the reciprocation motion. At this time, when the model material MD approaches the liquid level of the cleaning agent LQ2, the air in the vicinity of the cleaning agent LQ2 is mixed in solution, and thus, the liquid cleaning agent LQ2 including the foam is obtained. In addition, in a case where the mesh of the filter is fine, the foam is also produced by passing through the filter. Then, since the foamy cleaning agent LQ2 is supplied to the through hole provided in the model material MD, the cleaning in the through hole is performed.

Figure 18C:
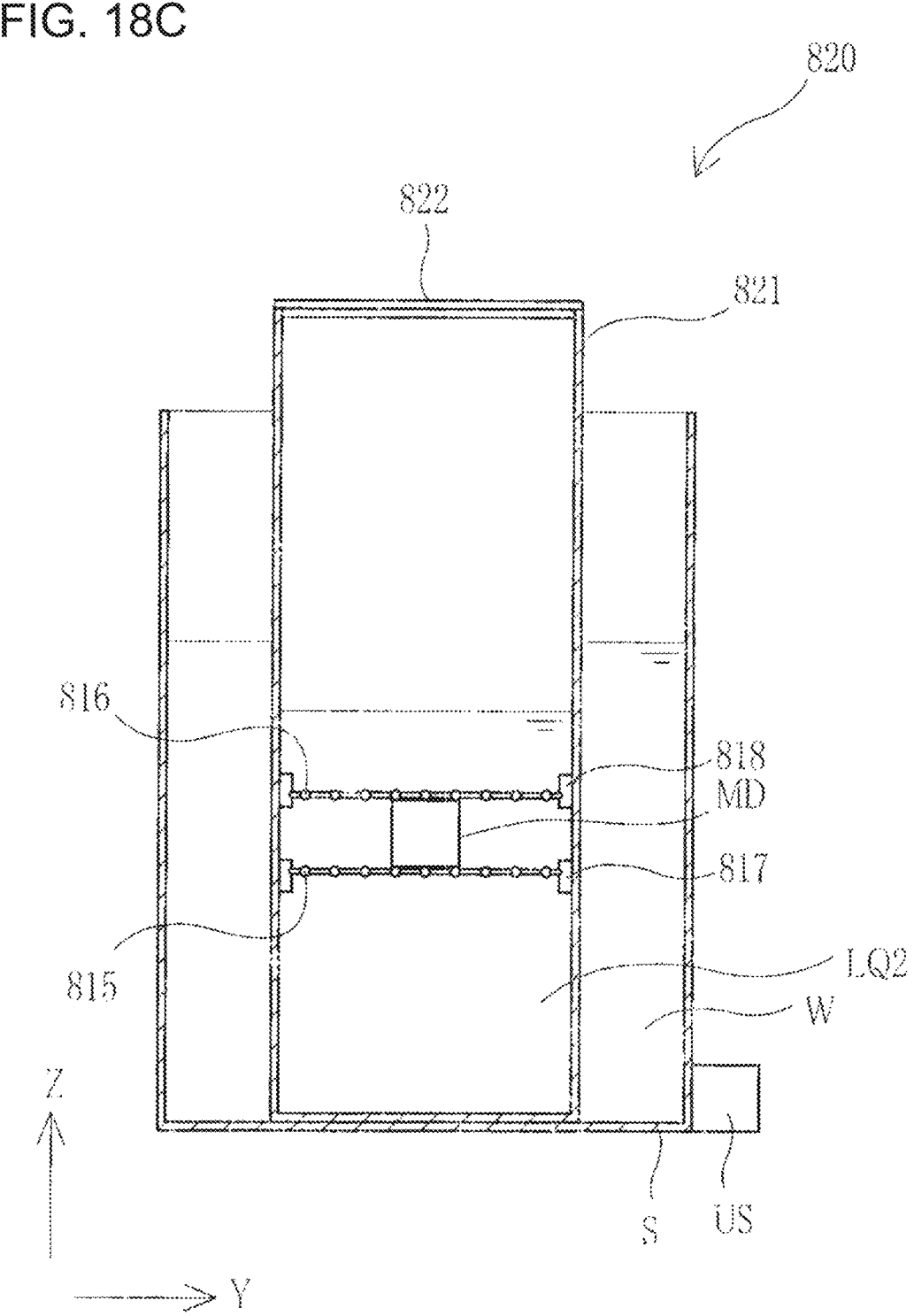
FIG. 18C is a sectional view illustrating an outline of the sealed type cleaning container.
Figure 18D:
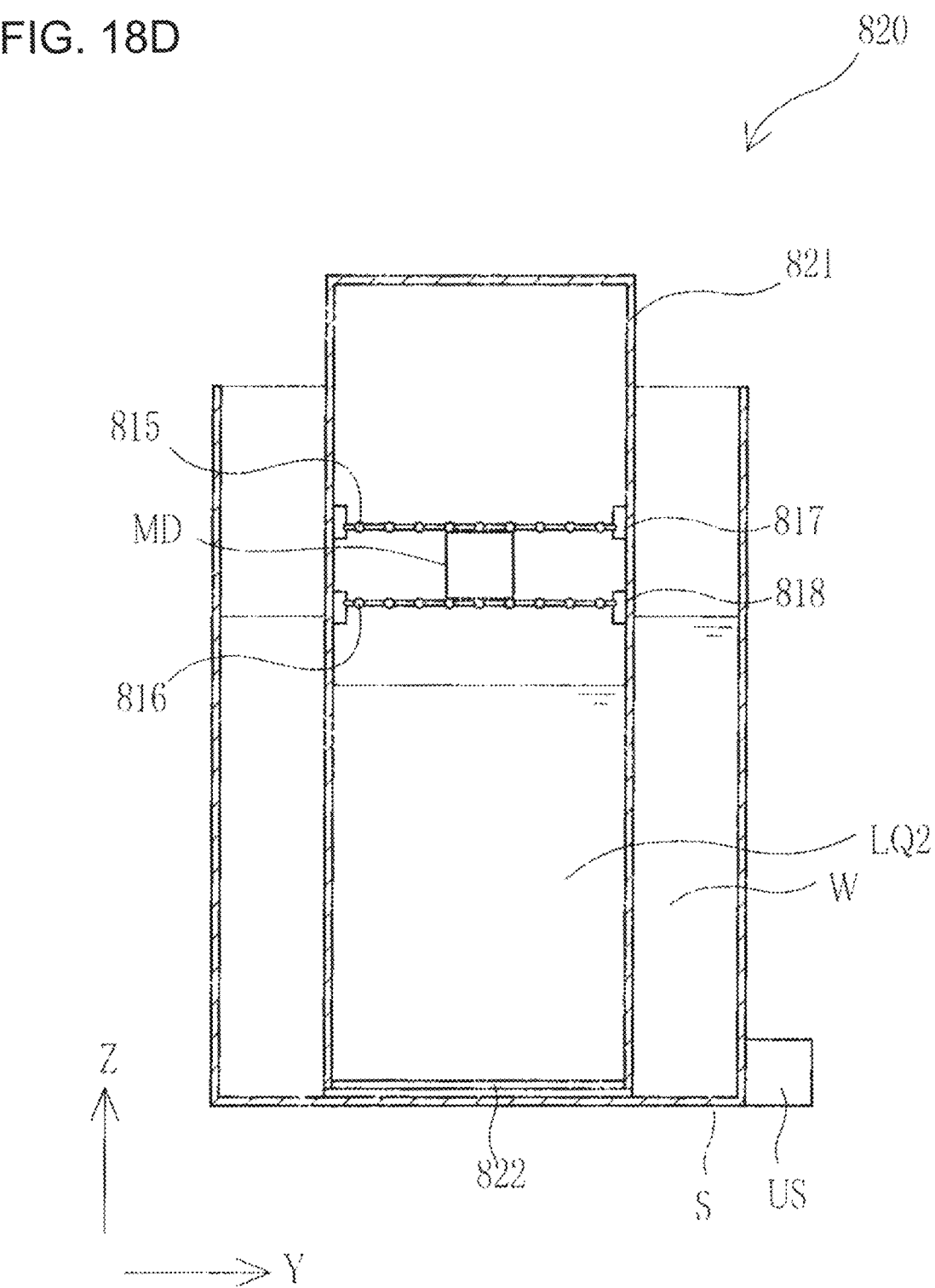
FIG. 18D is a sectional view illustrating an outline of the sealed type cleaning container.

In addition, the sealed type cleaning container may be configured as illustrated in FIG. 18C. In the sealed type cleaning container 820, the model material MD is fixed by the filters 815 and 186. A position in which the model material MD is fixed is set to a slightly lower position such that the model material is in a state of being dipped in the cleaning agent LQ2. In such a state, the cleaning using the cleaning agent LQ2 is performed. Further, the sealed type cleaning container 820 is disposed in a large tank S in which water W is stored, and the cleaning is accelerated by using an ultrasonic cleaning machine US. In this case, it is preferable that the sealed type cleaning container 820 contains a material such as glass, which transmits an ultrasonic wave. Next, as illustrated in FIG. 18D, in a case where the sealed type cleaning container 820 is disposed in the large tank S by being flipped vertically, the model material MD is up from the liquid level of the cleaning agent LQ2. As described above, the sealed type cleaning container 820 is switched between a forward direction (FIG. 18C) and a reverse direction (18D), and thus, the cleaning is accelerated by the motion of the cleaning agent LQ2 and the following occurrence of foam.

Figure 19:
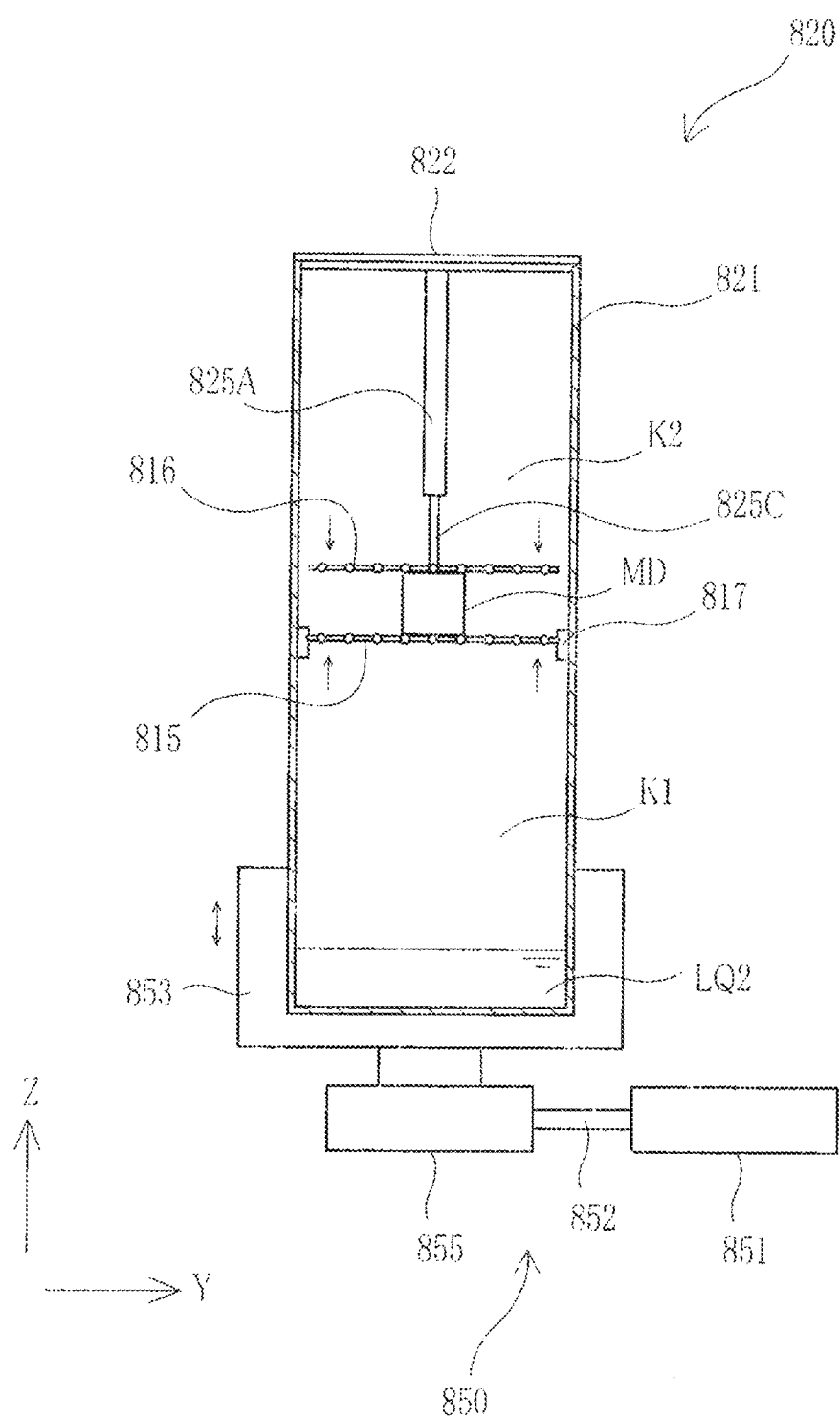
FIG. 19 is a sectional view illustrating an outline of the sealed type cleaning container.

Note that, by providing a linear movement mechanism 850 in the sealed type cleaning container 820, the sealed type cleaning step can be automated. As illustrated in FIG. 19, the linear movement mechanism 850 includes a motor 851, a rotation shaft 852 that is rotated in accordance with the driving of the motor 851, a retaining mechanism 853 retaining the sealed type cleaning container 820, and a cam mechanism 855. The cam mechanism 855 converts a rotational motion of the rotation shaft 852 into the reciprocation motion of the retaining mechanism 853 in the Z direction. The sealed type cleaning container 820 performs the reciprocation motion in the Z direction, in accordance with the drive of a motor 831. Accordingly, the cleaning agent LQ2 performs the reciprocation motion between the containing spaces K1 and K2 through the filters 815 and 816. Then, since the foamy cleaning agent LQ2 is supplied to the through hole provided in the model material MD, the cleaning in the through hole is performed.

Figure 20:
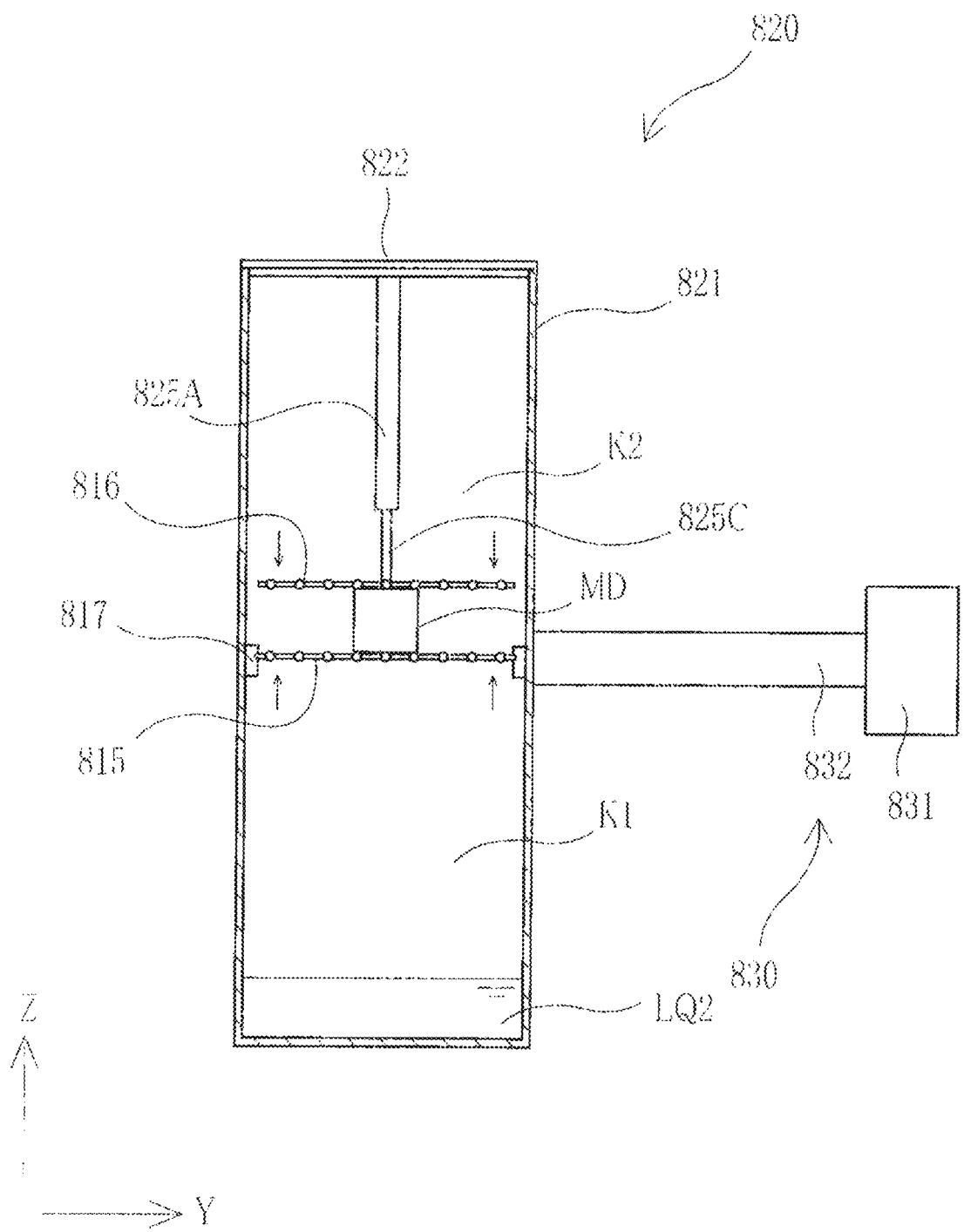
FIG. 20 is a sectional view illustrating an outline of the sealed type cleaning container.

Note that, by providing a rotation movement mechanism 830 in the sealed type cleaning container 820, the sealed type cleaning step can be automated. As illustrated in FIG. 20, the rotation movement mechanism 830 includes the motor 831 and a rotation shaft 832 that is rotated in accordance with the driving of the motor 831. The rotation shaft 832 extends in the Y direction. The rotation shaft 832 is rotated around a Y axis, in accordance with the driving of the motor 831. As a result thereof, the sealed type cleaning container 820 autorotates around the Y axis, in accordance with the driving of the motor 831, to the extent that the reciprocation motion of the cleaning agent LQ2 in the containing spaces K1 and K2 occurs. As a result thereof, the through hole provided in the model material MD is cleaned by the foamy cleaning agent LQ2. Note that, in a case where an orbital motion of the sealed type cleaning container is required, an arm extending from the rotation shaft 832 in a radial direction may be provided, and the sealed type cleaning container may be attached to the tip end of the arm.

Figure 21:
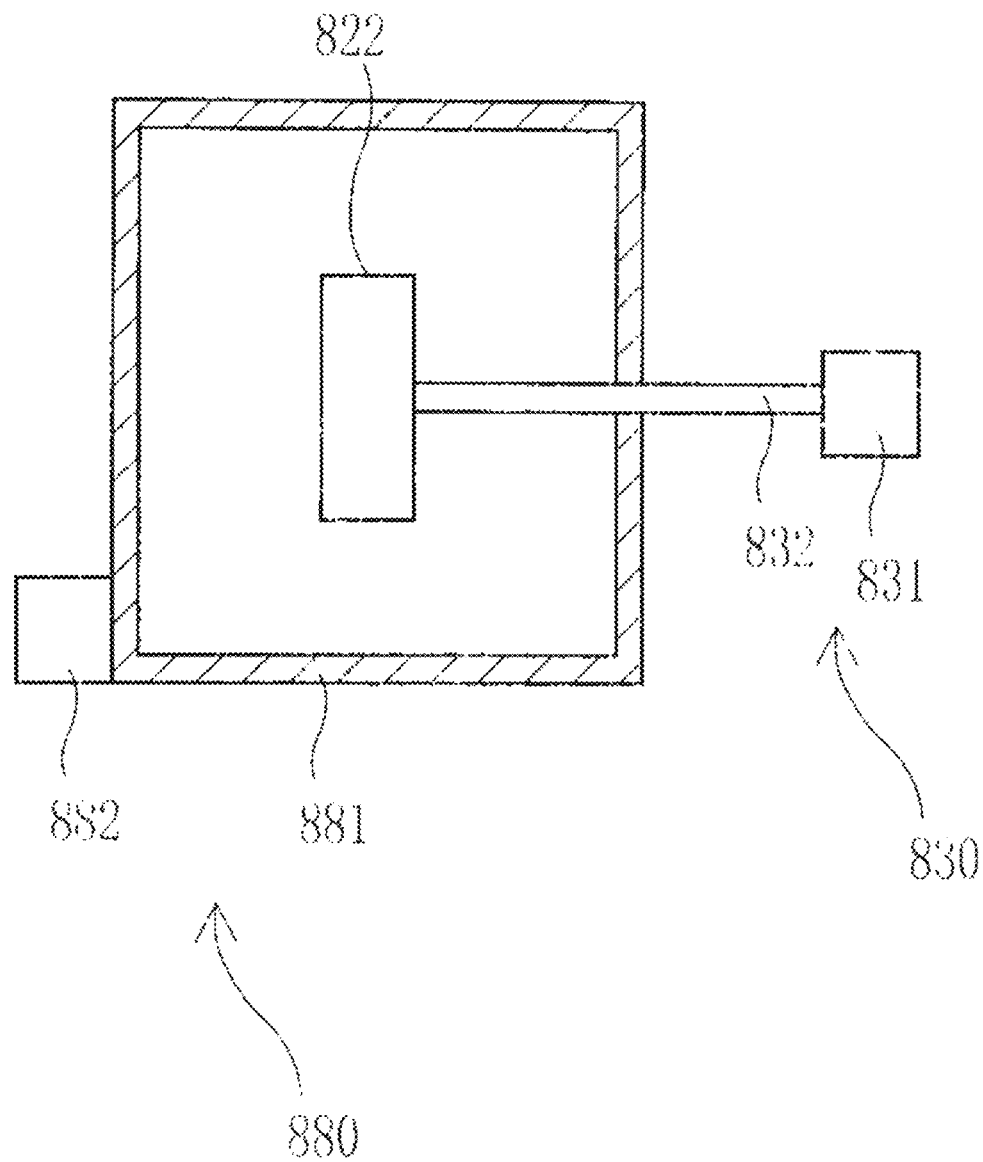
FIG. 21 is a sectional view illustrating an outline of the sealed type cleaning container.

In the embodiment described above, the sealed type cleaning step or the sealed type rinsing step is manually performed by using the sealed type cleaning container, but may be automated. In this case, it is preferable that a predetermined movement mechanism may be used. For example, as illustrated in FIG. 21, in the case of using the sealed type cleaning container 820 in a constant-temperature tank 880 including an external tank 881 and a temperature adjustment unit 882 adjusting a temperature in the internal space of the external tank 881, a hole is formed in a wall 881W of the external tank 881, and the rotation shaft 832 passes through the hole. The sealed type cleaning container 820 is contained in the internal space of the external tank. Then, by connecting the rotation shaft 832 and the sealed type cleaning container 820, the rotational motion of the sealed type cleaning container 820 can be performed in a predetermined temperature environment.

The rotation movement mechanism 830 or the linear movement mechanism 850 described above can be applied to not only the sealed type cleaning container 800 or the sealed type cleaning container 820, but also the sponge type cleaning device 200, the water wheel type cleaning device 300, or the pouch 610. In addition, even in the case of performing a predetermined step in the constant-temperature tank 880, as with a case illustrated in FIG. 21, the power of the motor disposed outside the external tank 881 can be transmitted to the sponge type cleaning device 200, the water wheel type cleaning device 300, or the pouch 610 through the rotation shaft by forming the hole is formed in the wall 881W of the external tank 881 and by allowing the rotation shaft to pass through the hole.

Note that, by using a liquid containing a carbonic acid (for example, carbonated water) in the cleaning agent LQ2, a cleaning effect is improved. Similarly, by using the liquid containing the carbonic acid (for example, the carbonated water), or a mixed liquid of the liquid containing the carbonic acid (for example, the carbonated water) and other liquids, as the rinsing liquid LQ5, a rinsing effect is improved.

Note that, an object that is a cleaning target is not limited to the model material MD. In addition, the substance to be removed may be a substance on which the cleaning component contained in the cleaning agent such as the support material SP or the preliminary cleaning agent acts. For example, in addition, in a case where the substance to be removed is general greasy stain, a neutral detergent may be used.

Note that, in the sponge type cleaning device 200 or the water wheel type cleaning device 300 described above, the foam occurs by a predetermined treatment with respect to the liquid, but the invention is not limited thereto, and the foam may be directly supplied to the cleaning target (such as the model material MD).

Note that, since the behavior of the coating liquid LQ3 is also the same as the behavior of the cleaning agent LQ2 in the sponge type cleaning step 122, the inner wall of the through hole can be coated with the coating liquid LQ3 by using the same means described above.

In the embodiment described above, the invention is used in the removal of the support material SP, but the invention is not limited thereto. For example, the invention may be applied to the removal of a buffing compound (a metal or a non-ferrous mirror polishing agent) in which chromium oxide is kneaded into an oil and fat material (a paraffin-based wax).

In the embodiment described above, the material that is used in the fused deposition modeling method, the inkjet method, or the like is used as the model material MD, but the invention is not limited thereto. A metal (for example, iron or non-ferrous metals) work may be used as the model material MD. The invention may be used for removing the support material attached to the metal work, or may be used for the following objects.

However, since cutting oil is attached to the metal work after cutting machining, it is necessary to remove the cutting oil in the case of using the metal work in such a state. Examples of the cutting oil that can be removed include oil-based cutting oil or water-soluble cutting oil. In addition, since the metal work such as iron is weak against rust, it is necessary to coat the metal work with rust-proof oil at transportation or storage.

In such a case, a part of the cleaning method 100 may be performed with respect to the metal work. In the preliminary cleaning step 110, the metal work is dipped in the preliminary cleaning agent LQ1. Accordingly, most of the oil-based cutting oil attached to the metal work is dissolved in the preliminary cleaning agent LQ1. As a result thereof, most of the oil-based cutting oil can be removed from the metal work.

Next, in the cleaning step 120, the metal work is dipped in the cleaning agent LQ2. Accordingly, the coating layer of the cleaning agent LQ2 is formed on the surface of the metal work. Such a coating layer functions as a rust-proof layer. Note that, the rinsing step 130 or the coating step 140 may not be performed after the cleaning step 120.

The same cleaning agent used for dissolving the support material SP can be applied as the preliminary cleaning agent LQ1 for removing the oil-based cutting oil.

The cleaning agent LQ2 for forming the rust-proof layer is soluble in water as a whole, and contains a solvent and a rust-proof component.

Water or alcohol is preferable as the solvent. The concentration of the solvent is not particularly limited insofar as the effect of the invention can be obtained, and is preferably greater than or equal to 5 weight % and less than or equal to 100 weight %, more preferably greater than or equal to 50 weight % and less than or equal to 100 weight %, and particularly preferably greater than or equal to 80 weight % and less than or equal to 100 weight %.

It is preferable to have an amino group and a hydrophilic group (excluding an amino group), as the rust-proof component. Examples of the hydrophilic group (excluding an amino group) include a hydroxy group, a carboxy group, a carbonyl group, a sulfo group, and the like. Specific examples thereof include ethanol amines (monoethanol amine, diethanol amine, or triethanol amine) and the like. The concentration of the cleaning component is not particularly limited insofar as the effect of the invention can be obtained, and is preferably greater than or equal to 10 weight % and less than or equal to 40 weight %.

In the embodiment described above, the removal of the cutting oil from the metal work has been described, but the invention is not limited thereto. The invention can also be applied to grease in addition to the cutting oil.

EXAMPLES

Tests A1 to A15 were performed.

(Test A1)

A three-dimensional modeled object X was formed from the model material MD and the support material SP by using a 3D printer (VisiJet series, manufactured by 3D Systems Corporation). The model material MD in the three-dimensional modeled object X is in a rectangular parallelepiped shape (Length: 50 mm, Breadth: 30 mm, Height: 30 mm). In the model material MD in a rectangular parallelepiped shape, five linear through holes (Diameter 0: 1.0 mm, Length: 30 mm) passing through the model material MD from the top surface toward the bottom surface are formed. The support material SP was attached to each of the surfaces of the model material MD with a uniform thickness (approximately 10 to 15 mm), and all of the through holes were filled with the support material.

VisiJet Crystal EX200 Plastic Material (manufactured by 3D SYSTEMS JAPAN K.K.) was used as the model material MD.

Components of Model Material MD:

Urethane Acrylate Oligomer 20 to 40 weight %

Ethoxylated Bisphenol A Diacrylate (CAS No. 64401-02-01) 15 to 35 weight %

Tripropylene Glycol Acrylate (CAS No. 42978-66-5) 1.5 to 3 weight %

VisiJet200 (manufactured by 3D SYSTEMS JAPAN K.K.) was used as the support material SP.

Components of Support Material SP: hydroxylated wax (CAS No. 112-95-5)

Melting Point of Support Material SP: 55 to 65° C.

Density of Support Material SP: 0.85 to 0.91 (g/cm$^3$)

The cleaning method 100 was performed with respect to the three-dimensional modeled object X.

The components of the used preliminary cleaning agent are as follows.

Fatty Acid Ester 70 weight %

Solid Paraffin (CAS No. 8002-74-2) 30 weight %

The components of the used cleaning agent are as follows.

| | |
|---|---|
| Water | 70 weight % |
| Triethanol Amine (CAS No. 102-71-6) | 20 weight % |
| Polyoxyalkylene Alkyl Ether | 10 weight % |

(Preliminary Cleaning Step)

In the sealing unit 60 illustrated in FIGS. 5A and 5B, the preliminary cleaning step was performed. A temperature T1 of the preliminary cleaning agent was maintained at 70° C. The three-dimensional modeled object X sank in the preliminary cleaning agent LQ1 (250 cc), the release valve 64 was closed, and the opening of the containing space 61KX was closed by using the lid 62. The containing space 61KX was decompressed by the pump 70. A decompression amount AP1 from the atmospheric pressure was 0.08 MPa. In the above condition, the preliminary cleaning step was performed. A time S1 for performing the preliminary cleaning step was 9 minutes.

(Cleaning Step)

Next, in the sealing unit 60, the cleaning step was performed. A temperature T2A of the cleaning agent was maintained at 65° C. The three-dimensional modeled object X sank in the cleaning agent LQ2 (250 cc), the release valve 64 was closed, and the opening of the containing space 61KX was closed by using the lid 62. The containing space 61KX was decompressed by the pump 70. The decompression operation was stopped at a point when the cleaning agent LQ2 started boiling. A decompression amount AP2 from the atmospheric pressure at the point when the cleaning agent LQ2 started boiling was 0.07 MPa. As described above, the cleaning step was performed by using the boiled cleaning agent LQ2. A time S2A for performing the cleaning step was 2 minutes.

Next, in the cleaning device 2 illustrated in FIG. 2, the cleaning step was performed. A temperature T2B of the cleaning agent was maintained at 65° C. The three-dimensional modeled object X sank in the cleaning agent LQ2 (250 cc), and an ultrasonic wave was applied to the cleaning agent LQ2 by the ultrasonic unit 40. A frequency f2 of the applied ultrasonic wave was 40 KHz. A time S2B for performing the cleaning step was 2 minutes.

(Rinsing Step)

Next, a beaker was disposed in the outer container 21 of the cleaning device 2. 250 cc of water was poured into the beaker. A temperature T3 of the water was maintained at 65° C. The three-dimensional modeled object X sank in hot water, and an ultrasonic wave was applied to the water by the ultrasonic unit 40. A frequency f3 of the applied ultrasonic wave was 40 KHz. A time S3 for performing the rinsing step was 3 minutes.

(Tests A2 to A15)

In Tests A2, A6, A7, A11, and A12, the cleaning method of the support material was performed with respect to the three-dimensional modeled object X, as with Test A1, except for conditions shown in Table 1. Note that, as the shape of the hole in the table, "Straight" indicates the shape in FIGS. 10A and 10B, "Crank" indicates the shape in FIG. 11A, and "U-shape" indicates the shape in FIG. 11B.

TABLE 1

| No | Hole diameter φ (mm) | Shape of hole | Preliminary cleaning agent Fatty acid ester (%) | Preliminary cleaning agent Solid paraffin (%) | Preliminary cleaning step T1 (°C.) | Preliminary cleaning step ΔP1 (MPa) | Preliminary cleaning step S1 (Min.) | Decompression type cleaning step T2A (°C.) | Decompression type cleaning step ΔP2 (MPa) *1 Boiling *2 Non-boiling | Decompression type cleaning step S2A (Min.) | Cleaning step T2B (°C.) | Cleaning step f2 (KHz) | Cleaning step S2B (Min.) |
|---|---|---|---|---|---|---|---|---|---|---|---|---|---|
| Test A1 | 1 | Straight | 70 | 30 | 70 | 0.08 | 9 | 65 | 0.07 *1 | 2 | 65 | 40 | 3 |
| Test A2 | 0.5 | Straight | 70 | 30 | 70 | 0.08 | 9 | 65 | 0.07 ** | 2 | 65 | 40 | 3 |
| Test A3 | 1 | Straight | 70 | 30 | 70 | 0.08 | 9 | 65 | 0.07 *1 | 2 | — | — | — |
| Test A4 | 0.5 | Straight | 70 | 30 | 70 | 0.08 | 9 | 65 | 0.07 *1 | 2 | — | — | — |
| Test A5 | 1 | Straight | 70 | 30 | 70 | 0.08 | 9 | 65 | 0.07 *1 | 2 | — | — | — |
| Test A6 | 1 | Crank | 70 | 30 | 70 | 0.08 | 9 | 65 | 0.07 *1 | 2 | 65 | 40 | 3 |
| Test A7 | 0.5 | Crank | 70 | 30 | 70 | 0.08 | 9 | 65 | 0.07 *1 | 2 | 65 | 40 | 3 |
| Test A8 | 1 | Crank | 70 | 30 | 70 | 0.08 | 9 | 65 | 0.07 *1 | 2 | — | — | — |
| Test A9 | 0.5 | Crank | 70 | 30 | 30 | 0.08 | 9 | 65 | 0.07 *1 | 2 | — | — | — |
| Test A10 | 1 | Crank | 70 | 30 | 70 | 0.08 | 9 | 65 | 0.07 *1 | 2 | — | — | — |
| Test A11 | 1 | U-shape | 70 | 30 | 70 | 0.08 | 9 | 65 | 0.07 *1 | 2 | 65 | 40 | 3 |
| Test A12 | 0.5 | U-shape | 70 | 30 | 70 | 0.08 | 9 | 65 | 0.07 *1 | 2 | 65 | 40 | 3 |
| Test A13 | 1 | U-shape | 70 | 30 | 70 | 0.08 | 9 | 65 | 0.07 *1 | 2 | — | — | — |
| Test A14 | 0.5 | U-shape | 70 | 30 | 70 | 0.08 | 9 | 65 | 0.07 *1 | 2 | — | — | — |
| Test A15 | 1 | U-shape | 70 | 30 | 70 | 0.08 | 9 | 65 | 0.07 *1 | 2 | — | — | — |

| No | Sponge type cleaning step T2C (°C.) | Sponge type cleaning step S2C (Min.) | Water wheel type cleaning step T2D (°C.) | Water wheel type cleaning step S2D (Min.) | Rinsing step T3A (°C.) | Rinsing step f3 (KHz) | Rinsing step S3A (Min.) | Sponge type rinsing step T3B (°C.) | Sponge type rinsing step S3B (Min.) | Water wheel type rinsing step T3C (°C.) | Water wheel type rinsing step S3C (Min.) | Cleaning degree evaluation (Surface) | Cleaning degree evaluation (Hole) |
|---|---|---|---|---|---|---|---|---|---|---|---|---|---|
| Test A1 | — | — | — | — | 65 | 40 | 3 | — | — | — | — | 3 | 1 |
| Test A2 | — | — | — | — | 65 | 40 | 3 | — | — | — | — | 3 | 1 |
| Test A3 | 65 | 1 | — | — | — | — | — | 65 | 3 | — | — | 3 | 3 |
| Test A4 | 65 | 1 | — | — | — | — | — | 65 | 3 | — | — | 3 | 3 |
| Test A5 | — | — | 65 | 1 | — | — | — | — | — | 65 | 3 | 3 | 3 |
| Test A6 | — | — | — | — | 65 | 40 | 3 | — | — | — | — | 3 | 1 |
| Test A7 | — | — | — | — | 65 | 40 | 3 | — | — | — | — | 3 | 1 |
| Test A8 | 65 | 1 | — | — | — | — | — | 65 | 3 | — | — | 3 | 3 |
| Test A9 | 65 | 1 | — | — | — | — | — | 65 | 3 | — | — | 3 | 3 |
| Test A10 | — | — | 65 | 1 | — | — | — | — | — | 65 | 3 | 3 | 3 |
| Test A11 | — | — | — | — | 65 | 40 | 3 | — | — | — | — | 3 | 1 |
| Test A12 | — | — | — | — | 65 | 40 | 3 | — | — | — | — | 3 | 1 |
| Test A13 | 65 | 1 | — | — | — | — | — | 65 | 3 | — | — | 3 | 3 |
| Test A14 | 65 | 1 | — | — | — | — | — | 65 | 3 | — | — | 3 | 3 |
| Test A15 | — | — | 65 | 1 | — | — | — | — | — | 65 | 3 | 3 | 3 |

In Test A3, the sponge type cleaning step using the sponge type cleaning device 200 illustrated in FIG. 8 was performed instead of the cleaning step using the cleaning device 2 illustrated in FIG. 2. A temperature T2C of the cleaning agent was maintained at 65° C. A time S2C for performing the cleaning step was 1 minute. Then, the sponge type rinsing step using the sponge type cleaning device 200 illustrated in FIG. 8 was performed instead of the rinsing step of Test A1. A temperature T3B of the rinsing liquid was maintained at 65° C. A time S3B for performing the cleaning step was 3 minutes.

In Tests A4, A8, A9, A13, and A14, the sponge type cleaning step using the sponge type cleaning device 200 illustrated in FIG. 8 was performed instead of the cleaning step using the cleaning device 2 illustrated in FIG. 2. Then, the sponge type rinsing step using the sponge type cleaning device 200 illustrated in FIG. 8 was performed instead of the rinsing step of Test A1. The sponge type cleaning step and the sponge type cleaning step were performed in the same condition as that of Test A3, except for the conditions shown in Table 1.

In Test A5, the water wheel type cleaning step using the water wheel type cleaning device 300 illustrated in FIG. 13A was performed instead of the cleaning step using the cleaning device 2 illustrated in FIG. 2. A temperature T2D of the cleaning agent was maintained at 65° C. A time S2D for performing the cleaning step was 1 minute. Then, the water wheel type rinsing step using the water wheel type cleaning device 300 illustrated in FIG. 13A was performed instead of the rinsing step of Test A1. A temperature T3C of the rinsing liquid was maintained at 65° C. A time S3C for performing the cleaning step was 3 minutes.

In Tests A10 and A15, the water wheel type cleaning step using the water wheel type cleaning device 300 illustrated in FIG. 13A was also performed instead of the cleaning step using the cleaning device 2 illustrated in FIG. 2. Then, the water wheel type rinsing step using the water wheel type cleaning device 300 illustrated in FIG. 13A was performed instead of the rinsing step of Test A1. The water wheel type cleaning step and the water wheel type rinsing step were performed in the same condition as that of Test A5, except for the conditions shown in Table 1.

The three-dimensional modeled object X (a model material) after Tests A1 to A15 was evaluated on the basis of the following criteria. Each evaluation result is shown in Table 1

1. Cleaning Degree Evaluation (Surface)

The surface of the three-dimensional modeled object X (the model material) (excluding the through hole) after Tests A1 to A15 was evaluated.

Evaluation criteria are as follows.
1: According to visual observation, most of the support material remained.
2: According to visual observation, a small amount of the support material remained.
3: According to visual observation, no support material remained.

2. Cleaning Degree Evaluation (Hole)

The through hole of the three-dimensional modeled object X (the model material) after Tests A1 to A15 was evaluated.
Evaluation criteria are as follows.
1: According to visual observation, most of the support material remained.
2: According to visual observation, a small amount of the support material remained.
3: According to visual observation, no support material remained.

(Test B1)

By using water, the model material MD after performing Test A3 was set in the sponge type cleaning device 200 illustrated in FIG. 8. The sponge 220 was filled with the water up to half the height, and the elastic deformation and the restoration of the sponge 220 were repeated for 1 minute by using the model material MD, but the water did not enter the through hole of the model material MD.

(Test B2)

By using water containing a neutral detergent (a concentration of 2 weight %), the elastic deformation and the restoration of the sponge 220 were repeated for 1 minute by using the model material MD, as with Test B2. A foamy liquid was overbrimmed from the through hole (the upper side) of the model material MD.

Note that, the present invention is not limited to the embodiment described above, and it is obvious that the invention can be variously changed within a range not departing from the gist of the invention.

EXPLANATIONS OF LETTERS OR NUMERALS

2 CLEANING DEVICE
100 CLEANING METHOD OF HIGH-MOLECULAR COMPOUND
110 PRELIMINARY CLEANING STEP
120 CLEANING STEP
130 RINSING STEP
200 SPONGE TYPE CLEANING DEVICE
210 SPONGE TYPE CLEANING TANK
210E OUTLET
220 SPONGE
221 DECOMPRESSION TYPE CLEANING STEP
222 SPONGE TYPE CLEANING STEP
223 SPONGE TYPE RINSING STEP
230 SAMPLE RETAINING STRUCTURE
240 MOVEMENT MECHANISM
250 CLEANING AGENT SUPPLY MECHANISM
260 LIQUID SUPPLY MECHANISM
270 WASTE LIQUID CONTAINING TANK
280 LIQUID LEVEL SENSOR
290 CONTROL MECHANISM
300 WATER WHEEL TYPE CLEANING DEVICE
310 WATER WHEEL TYPE CLEANING TANK UNIT
320 WATER WHEEL TYPE RINSING TANK UNIT
330 LID UNIT
410 ULTRASONIC CLEANING MACHINE
420 EXTERNAL CYLINDER

The invention claimed is:

1. A supply device comprising:
a gas-liquid supply mechanism configured to supply a liquid substance containing foam to one or more of openings formed on a surface of a sample,
wherein the gas-liquid supply mechanism is configured to freely switch between a gas-liquid contact state in which the sample is in contact with the liquid substance and a gas-liquid contact retraction state in which the sample is retracted from contacting the liquid substance repeatedly, and
a size of the one or more of openings ranges from 0.5 mm to 2 mm,
wherein the gas-liquid supply mechanism includes:
a sponge having elasticity;
a tank containing the sponge; and
a sponge deformation mechanism configured to deform the sponge, wherein
the sponge has an open-cell structure, the sponge in the tank is partially exposed from a liquid level and contains the liquid substance, in the gas-liquid contact retraction state, the sponge deformation mechanism is capable of deforming the sponge such that an abutting portion of the sponge is recessed in a state in which the one or more of openings of the sample abut to the sponge, and releasing the deformation of the sponge such that the one or more of openings of the sample are retracted from the sponge, and the gas-liquid contact state is set in accordance with the deformation of the sponge, and the gas-liquid contact retraction state is set in accordance with the release of the deformation of the sponge.

2. The supply device according to claim 1, wherein a cut is formed in the sponge, and the cut is capable of containing the sponge.

3. The supply device according to claim 1, wherein the sponge is formed into a cylindrical body and is configured to surround the sample.

4. The supply device according to claim 1, wherein the sponge is in a shape of a sheet and is configured to surround the sample.

5. The supply device according to claim 3, wherein the sponge includes a sheet-shaped sponge main body,
the sheet-shaped sponge main body includes:
a first engagement portion; and
a second engagement portion formed in a position separated from the first engagement portion,
the first engagement portion can be engaged/disengaged with respect to the second engagement portion, and
when the first engagement portion is engaged with the second engagement portion, the sheet-shaped sponge main body is capable of surrounding the sample.

6. The supply device according to claim 1, wherein the sponge deformation mechanism is configured to deform the tank entirely, or deform a part of the tank, and
the sponge is disposed in the tank so as to deform together with deformation of a deformable portion of the tank.

7. The supply device according to claim 1, wherein the sponge deformation mechanism includes:
a movement mechanism configured to freely move the sample forward and backward with respect to the sponge, in a manner that the sponge is freely switched between a press state in which the sponge is pressed by the sample, and a press retraction state in which the sample is retracted from the sponge, and
the gas-liquid contact state is set in the press state, and the gas-liquid contact retraction state is set in the press retraction state.

8. The supply device according to claim 1, wherein the sample comprises a support material and a model material,
the cleaning agent has fluidity in a range of a melting point that is higher than or equal to that of the support material and lower than a melting point of the model material, in which, the melting point of the support material is lower than that of the model material,
the supply device further comprises a temperature adjustment mechanism capable of adjusting a temperature such that the cleaning agent has the fluidity,
the temperature adjustment mechanism includes:
an external tank configured to contain the tank, the liquid substance, and the sample; and
a temperature adjustment unit configured to adjust a temperature of an internal space of the external tank,
the movement mechanism includes:
a shaft;
a driving device configured to rotate the shaft; and
a cam mechanism configured to convert a rotational motion of the shaft to a linear motion of the sample,
wherein the driving device is disposed outside the external tank, and
the shaft is communicated with a hole formed in the external tank.

9. The supply device according to claim 1, wherein the sample includes a model material formed by a 3D printer; and a support material attached to the model material.

10. The supply device according to claim 9, wherein the liquid substance is a cleaning agent for removing the support material from the model material.

11. A supply device comprising:
a gas-liquid supply mechanism configured to supply a liquid substance containing foam to one or more of openings formed on a surface of a sample,
wherein the gas-liquid supply mechanism is configured to freely switch between a gas-liquid contact state in which the sample is in contact with the liquid substance and a gas-liquid contact retraction state in which the sample is retracted from contacting the liquid substance repeatedly;
wherein the gas-liquid supply mechanism includes:
a tank;
a lid configured to freely close and open formed in the tank;
a filter configured to partition a containing space of the tank into a first containing space and a second containing space; and
a movement mechanism configured to move the tank to perform at least one of a reciprocation motion, a rotational motion, and an orbital motion;
the filter is capable of allowing the liquid substance to pass through and controlling passing of the sample,
the sample is disposed on one side of the containing space partitioned by the filter,
the liquid substance reciprocates between the first containing space and the second containing space through the filter, in accordance with impartment of an external force, and
the reciprocation of the liquid substance causes switching between the gas-liquid contact state and the gas-liquid contact retraction state;
wherein the cleaning agent has fluidity in a range of a melting point that is higher than or equal to that of the support material and lower than a melting point of the model material, in which, the melting point of the support material is lower than that of the model material,
the supply device further comprises a temperature adjustment mechanism capable of adjusting a temperature such that the cleaning agent has the fluidity,
the temperature adjustment mechanism includes:
an external tank capable of containing the tank, the liquid substance, and the sample; and
a temperature adjustment unit capable of adjusting a temperature of an internal space of the external tank,
the movement mechanism includes:
a shaft;
a driving device capable of rotating the shaft; and
a power transmission mechanism capable of converting a rotational motion of the shaft into at least one of the reciprocation motion, the rotational motion, and the orbital motion of the tank, the driving device is disposed outside the external tank, and the shaft is communicated with a hole formed in the external tank.

\* \* \* \* \*